(12) United States Patent
Whiddon

(10) Patent No.: US 8,944,391 B2
(45) Date of Patent: Feb. 3, 2015

(54) HAND OPERATED MOUNT

(76) Inventor: Leslie Alvin Whiddon, Newville, AL (US)

( * ) Notice: Subject to any disclaimer, the term of this patent is extended or adjusted under 35 U.S.C. 154(b) by 683 days.

(21) Appl. No.: 13/227,421

(22) Filed: Sep. 7, 2011

(65) Prior Publication Data

US 2012/0228444 A1    Sep. 13, 2012

Related U.S. Application Data

(60) Provisional application No. 61/403,697, filed on Sep. 20, 2010.

(51) Int. Cl.
| | | |
|---|---|---|
| *F16M 11/14* | (2006.01) | |
| *F16M 11/10* | (2006.01) | |
| *B60R 11/04* | (2006.01) | |
| *F16M 11/18* | (2006.01) | |
| *F16M 11/20* | (2006.01) | |
| *F16M 13/02* | (2006.01) | |
| *F21V 21/30* | (2006.01) | |
| *B60Q 1/24* | (2006.01) | |
| *F21W 131/10* | (2006.01) | |

(52) U.S. Cl.
CPC ............... *F16M 11/10* (2013.01); *B60R 11/04* (2013.01); *F16M 11/18* (2013.01); *F16M 11/2014* (2013.01); *F16M 13/02* (2013.01); *F21V 21/30* (2013.01); *B60Q 1/245* (2013.01); *F21W 2131/10* (2013.01)

USPC ............................ 248/183.2; 248/51; 362/285

(58) Field of Classification Search
USPC ........... 248/183.2, 583, 584, 51; 362/11, 285, 362/523
See application file for complete search history.

(56) References Cited

U.S. PATENT DOCUMENTS

| | | | | |
|---|---|---|---|---|
| 2,508,071 | A * | 5/1950 | Martin et al. | 340/815.77 |
| 4,075,470 | A * | 2/1978 | Moore | 362/287 |
| 4,890,713 | A * | 1/1990 | Pagano | 192/142 R |
| 6,428,197 | B1 * | 8/2002 | Downing | 362/523 |
| 6,637,904 | B2 * | 10/2003 | Hernandez | 362/8 |

* cited by examiner

*Primary Examiner* — Gwendolyn W. Baxter

(57) ABSTRACT

A hand operated mount 100 is disclosed which can be mounted into the roof of a vehicle, vessel, or building and used to accurately control from inside the vehicle, vessel or building various types of devices that can be externally mounted on it, such as spotlights 127, cameras 110, heat measuring devices 123, listening devices 129, loud speakers 130, water canons 150, guns 118, and other type devices that are necessary to aim. The horizontal axis remains on a horizontal plane and rotates 360 degrees uninterrupted. The vertical axis rotates 180 degrees. The two axis of movement gives the ability to aim mounted devices in any direction. Power is supplied though an electric disc and rod eliminating the restriction of a wire that would prevent 360 degree uninterrupted rotation. Vertical and horizontal brakes and adjustable resistance allows ease of use and the ability to lock the mounted devices in position.

7 Claims, 25 Drawing Sheets

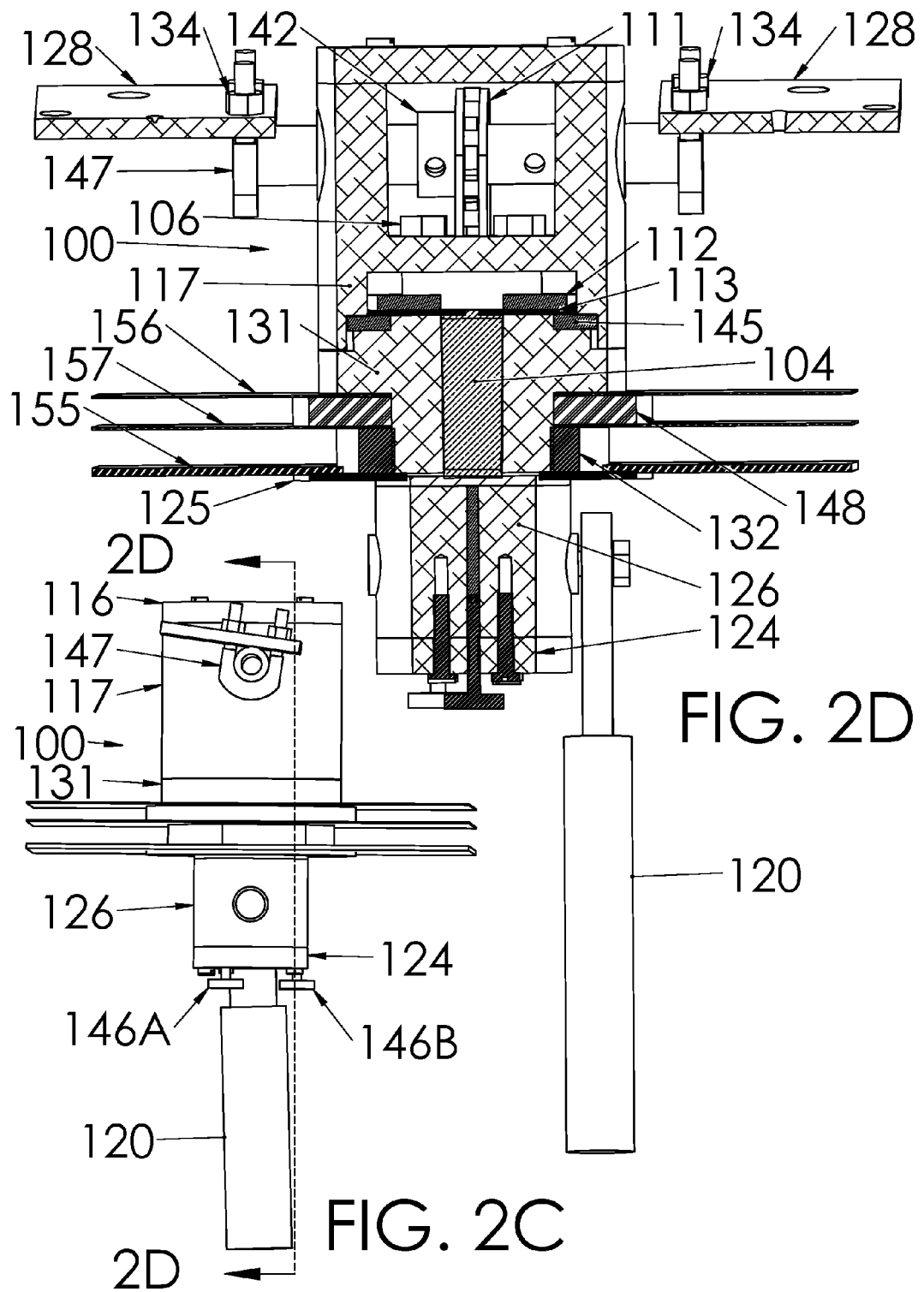

126

126

126

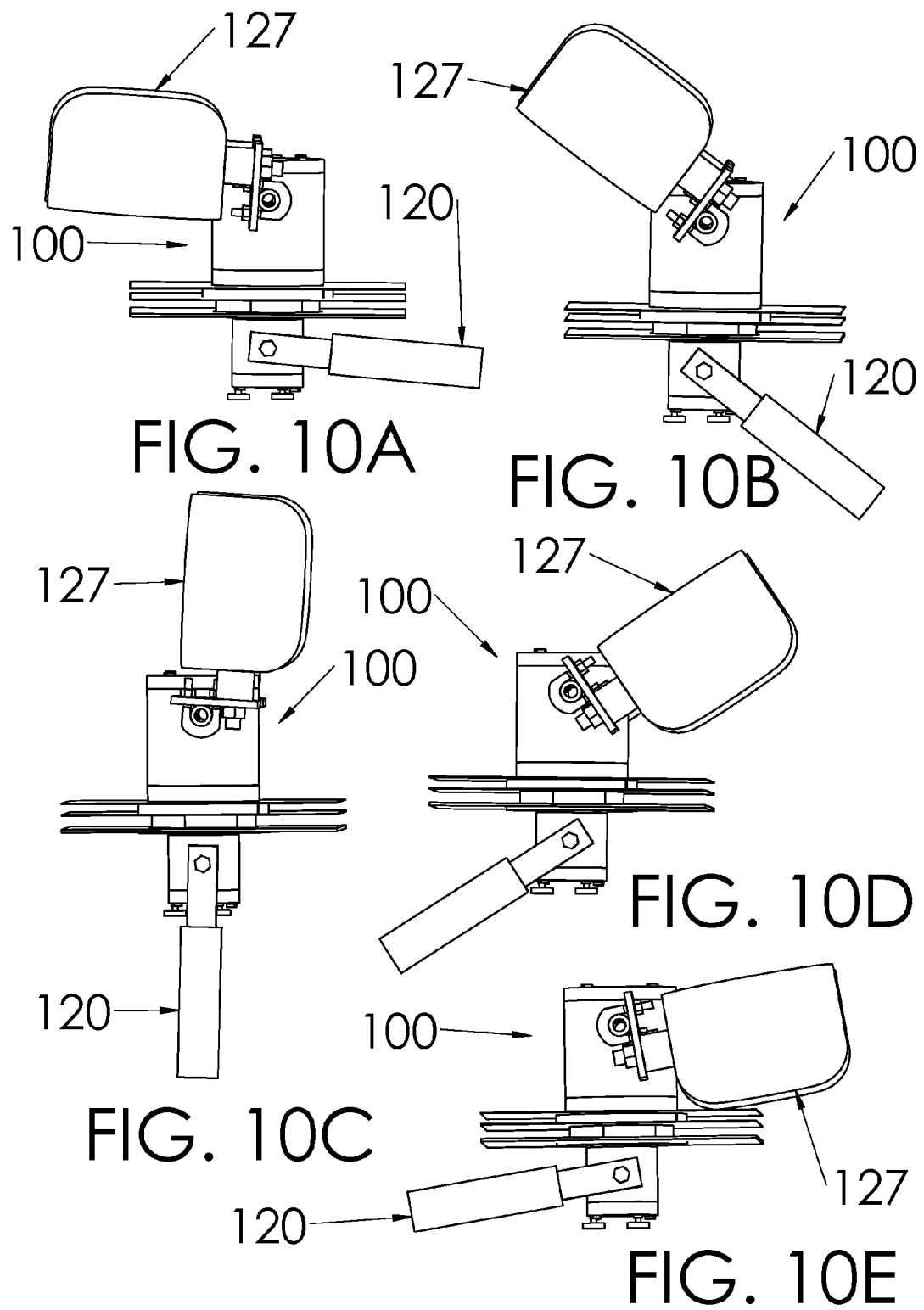

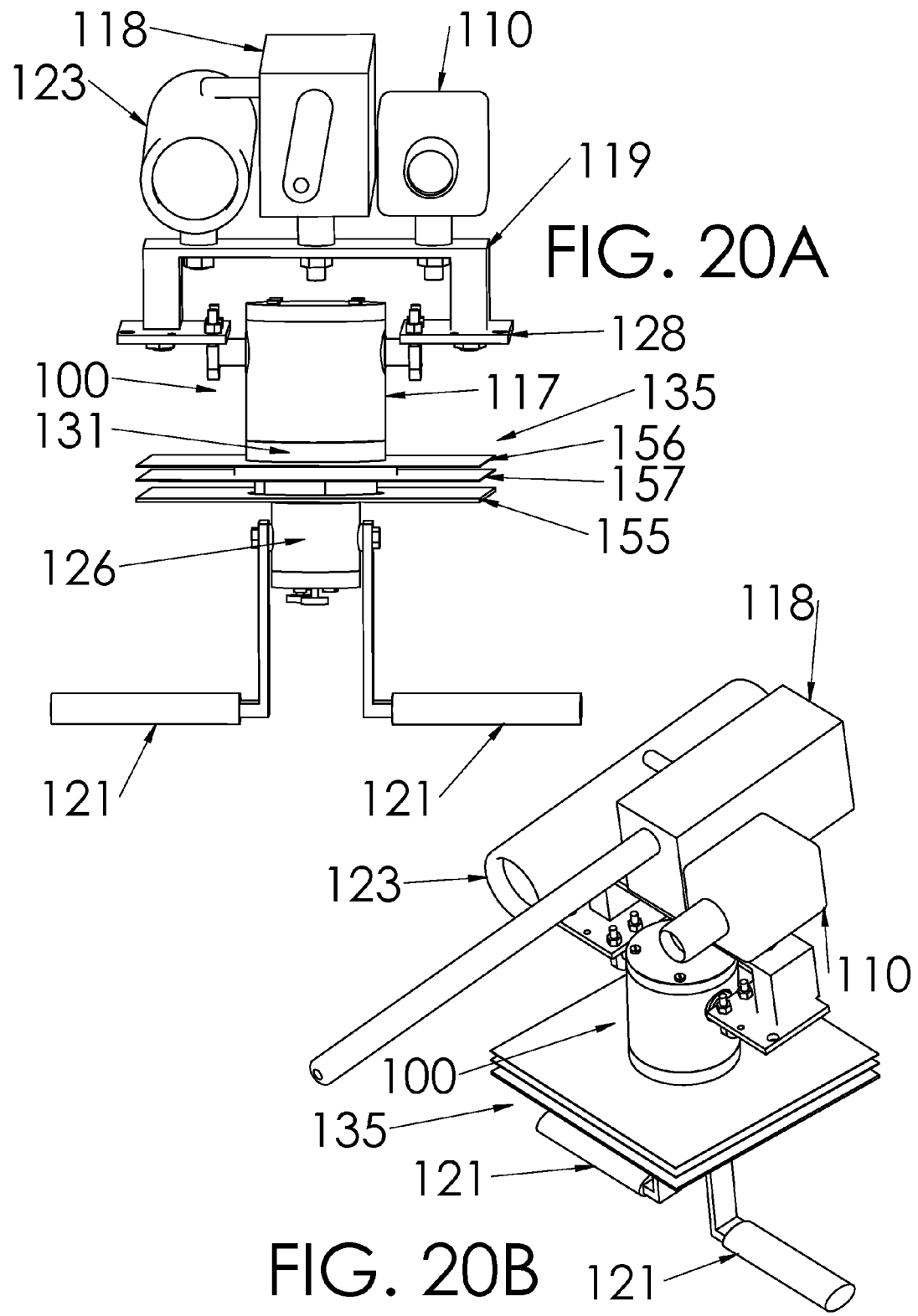

US 8,944,391 B2

HAND OPERATED MOUNT

CROSS REFERENCE TO RELATED APPLICATIONS

This application claims priority to U.S. Provisional Application No. 61/403,697, same title herewith, filed on Sep. 20, 2010, which is incorporated in its entirety herein by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

This invention meets the need to accurately and quickly aim external devices mounted to the roof of a vehicle, vessel or building from within such vehicle, vessel, or building by one or two hands. The closest current product is a spotlight that mounts in the doorpost of a vehicle and is hand controlled but is very difficult to aim because neither axis is on a fixed plane so it changes the plane of one axis as a means to raise or lower the aim of the light thereby forcing the operator to awkwardly move the other axis up and down while rotating the other axis at the same time to find the intended target, making it difficult to aim at something if it is to the side of the vehicle the light is mounted on and impossible if the target is on the other side of the vehicle, and is only capable of having a single light mounted on it.

For the reasons stated above and for other reasons stated below which will become apparent to those skilled in the art upon reading and understanding the present specification, there is a need in the art for an effective and efficient hand operated mount that can be mounted to the roof of a vehicle, vessel or building which allows the operator from within the vehicle, vessel or building to quickly aim and control the many types of devices that can be mounted on the hand operated mount, pointing the devices at the intended target no matter where the target is in relation to the vehicle, vessel or building.

BRIEF DESCRIPTION OF THE SEVERAL VIEWS OF THE DRAWINGS

The hand operated mount can be more easily understood and further advantages and uses thereof more readily apparent, when considered in view of the detailed description and the following figures in which:

FIG. 2C is a side view of the hand-operated mount.
FIG. 2D is a vertical sectional view taken along line 2D-2D of FIG. 2C.

FIG. 10A, 10B, 10C, 10D, 10E are all side views of the hand operated mount with two spotlights mounted on it that demonstrates the vertical movement of the hand operated mount. Starting with FIG. 10A where the lights are pointing down and then progressively moving the lights upward so that in FIG. 10E they are pointing up.

FIG. 20A is a front view and

FIG. 20B is a perspective view of a hand operated mount, mounted in a section of roof with a gun, camera and heat measuring device mounted on the hand operated mount.

DETAILED DESCRIPTION OF THE INVENTION

In the following detailed description, reference is made to the accompanying drawings, which form a part hereof, and in which is shown by way of illustration specific embodiments in which the invention may be practiced. These embodiments are described in sufficient detail to enable those skilled in the art to practice the invention, and it is to be understood that other embodiments may be utilized and mechanical changes may be made without departing from the spirit and scope of the present invention. The following detailed description is, therefore, not to be taken in a limiting sense, and the scope of the present invention is defined only by the claims and equivalents thereof.

Figure 1A:
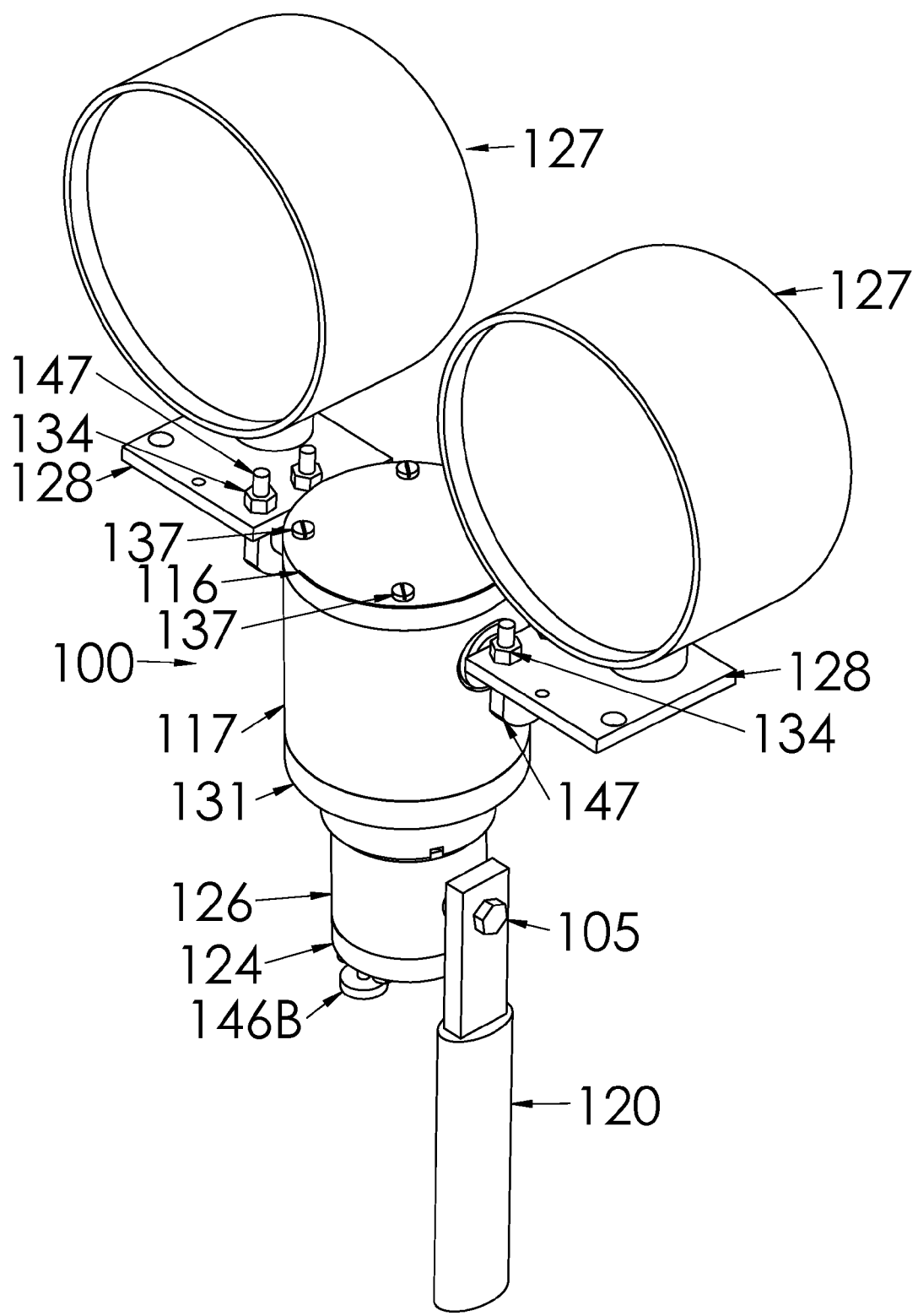
FIG. 1A is a perspective view of the hand-operated mount with two spotlights mounted on it to show a typical use.

Referring to FIG. 1A embodiments of the present invention provide a hand-operated mount 100 that has two spotlights 127 mounted on it. The hand operated mount 100 has a handle 120 for controlling the horizontal and vertical position of the spotlights 127; by moving the handle 120 forward the spotlights 127 rise, by moving the handle 120 backward the spotlights 127 move down. By twisting the handle 120 in either direction a person is able with one hand to twist the spotlights 127 horizontally as the handle 120 moves. A person can simultaneously change the vertical and horizontal position of the handle 120 and spotlights 127 giving quick and accurate control of the spotlights or whatever devices{s} are mounted on the hand operated mount 100.

Figure 1B:
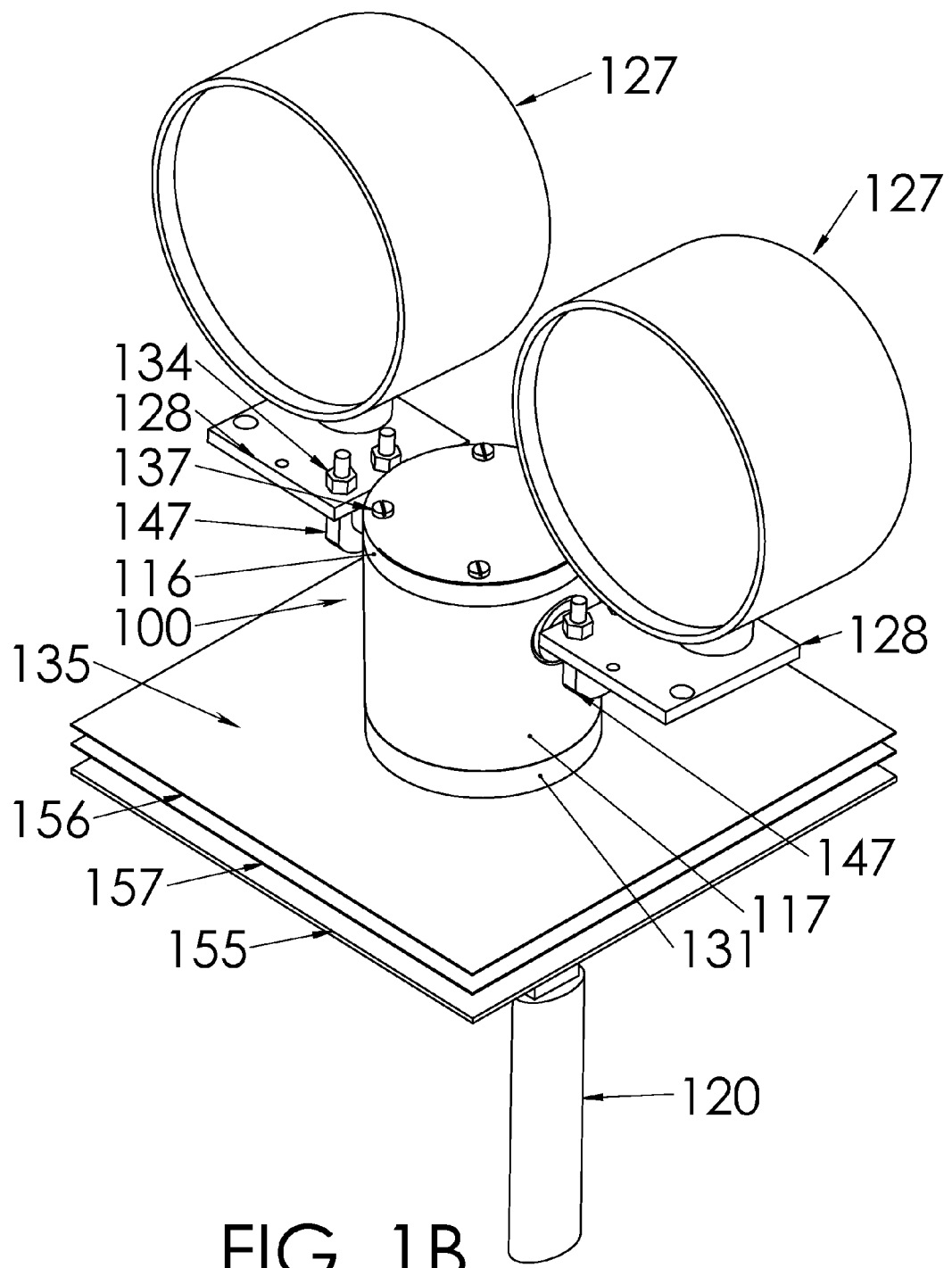
FIG. 1B is a perspective view of the hand-operated mount with two spotlights mounted on it, mounted into a section of roof to demonstrate how it looks in actual use.

Referring to FIG. 1B embodiments of the present invention provide a hand operated mount 100, mounted into a section of roof 135 with two spotlights 127 mounted on the hand operated mount 100. The section of roof 135 is illustrative of a typical mounting location of the hand-operated mount 100 in the roof of a vehicle, vessel or building.

Referring to FIG. 2D, the hand-operated mount 100 consists of an exterior housing 117 and interior housing 126 that are bolted together with two bolts 106. The interior housing 126 transverses through the mounting housing 131 suspended inside a mounting housing bearing 104 that allows the free horizontal rotational movement of the exterior housing 117 and interior housing 126. The mounting housing 131 has a thrust bearing 145 on top to prevent friction with the exterior housing 117 and a thrust bearing 144 on the bottom to prevent friction with the interior housing 126 and provide a surface for the horizontal brake rod 107 to contact. The mounting housing 131 also has an electrical disc insulator 113 with an electrical disc 112 on top of it with both screwed to the top of the mounting housing 131 with two screws 136 that are each inside a plastic shoulder spacer flange 140 to insulate from electrical short. Referring to FIG. 2B the exterior housing 117 has an exterior cap 116 screwed into place with four screws 137 to protect the internal components from the elements. The interior housing 126 has an interior cap 124 screwed into place with four screws 137 to contain the internal components in place and provide threaded holes for the horizontal brake and vertical brake and vertical resistance adjustment screw 137. The exterior housing 117 has an exterior shaft 138 that is suspended inside two bearings 102. The interior housing 126 has an interior housing shaft 139 that is suspended in two bearings 103. The interior housing shaft 139 has a handle 120 or two handles for a gun 121 bolted to it with bolt 105. Referring to FIG. 3B a chain 111 runs around a sprocket 142 on the exterior housing shaft 138 though the interior housing 126 and around the sprocket 143 that is on the interior-housing shaft 139 and back to the exterior shaft sprocket 142. The chain 111 causes the exterior shaft 138, and interior shaft 139 to rotate in unison so that the movement of the handle 120 rotating the interior housing shaft 139 results in a like rotational movement of the spotlights 127 which are mounted on the exterior housing shaft 138. Different size sprockets may be used to vary the ratio of movement between the handle 120 or handles 121 and the device{s} mounted on the hand-operated mount 100. Referring to FIG. 2D the mounting housing 131 is secured into the roof of a vehicle, vessel, or building with a mounting nut 132 and the nut is covered up with an interior-dressing washer 125 that fits against the headliner 155 in a vehicle, vessel or building that has a headliner. On vehicles, vessels or buildings that have a outer roof liner 156 and inner roof liner 157 the use of the washer to go between roof liners 148 will be necessary so that the mounting nut 132 can be tightened with sufficient force to hold the mounting housing 131 in place. On mounting locations that only have one layer the use of the washer to go between roof liners 148 and the interior-dressing washer 125 will be unnecessary.

Figure 2A:
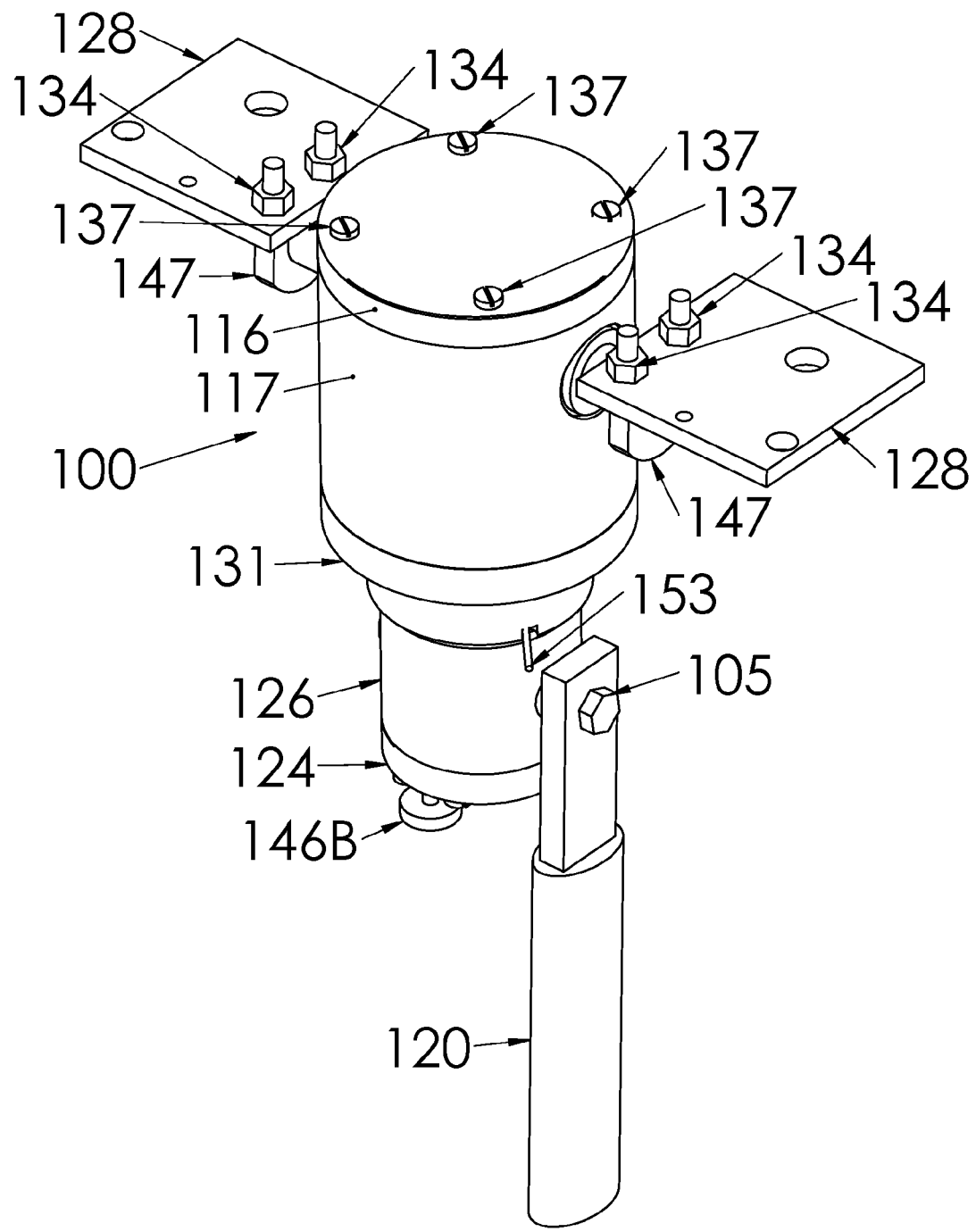
FIG. 2A is an isometric view of the hand-operated mount.
Figure 2B:
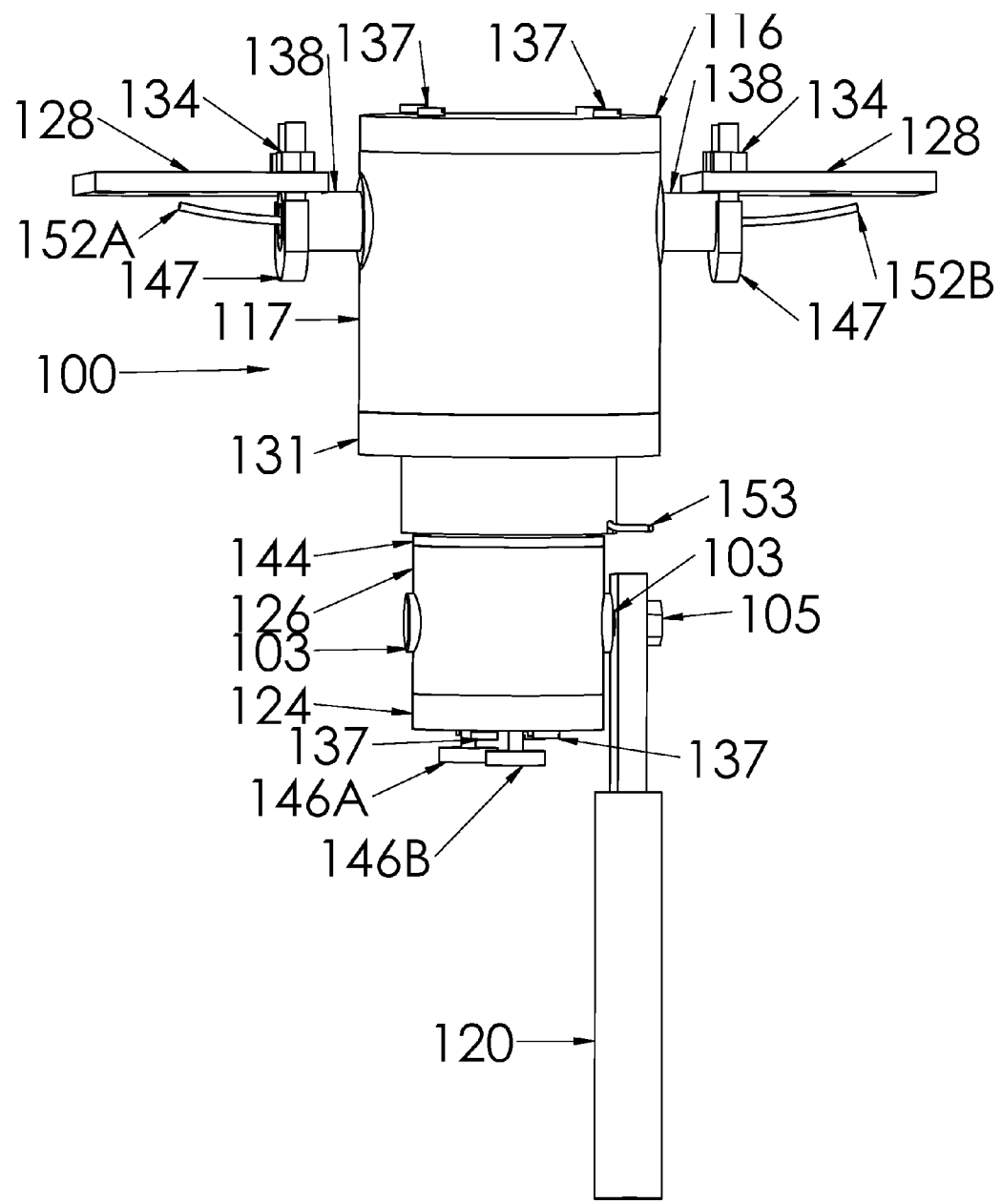
FIG. 2B is a front view of the hand-operated mount.
Figure 3A:
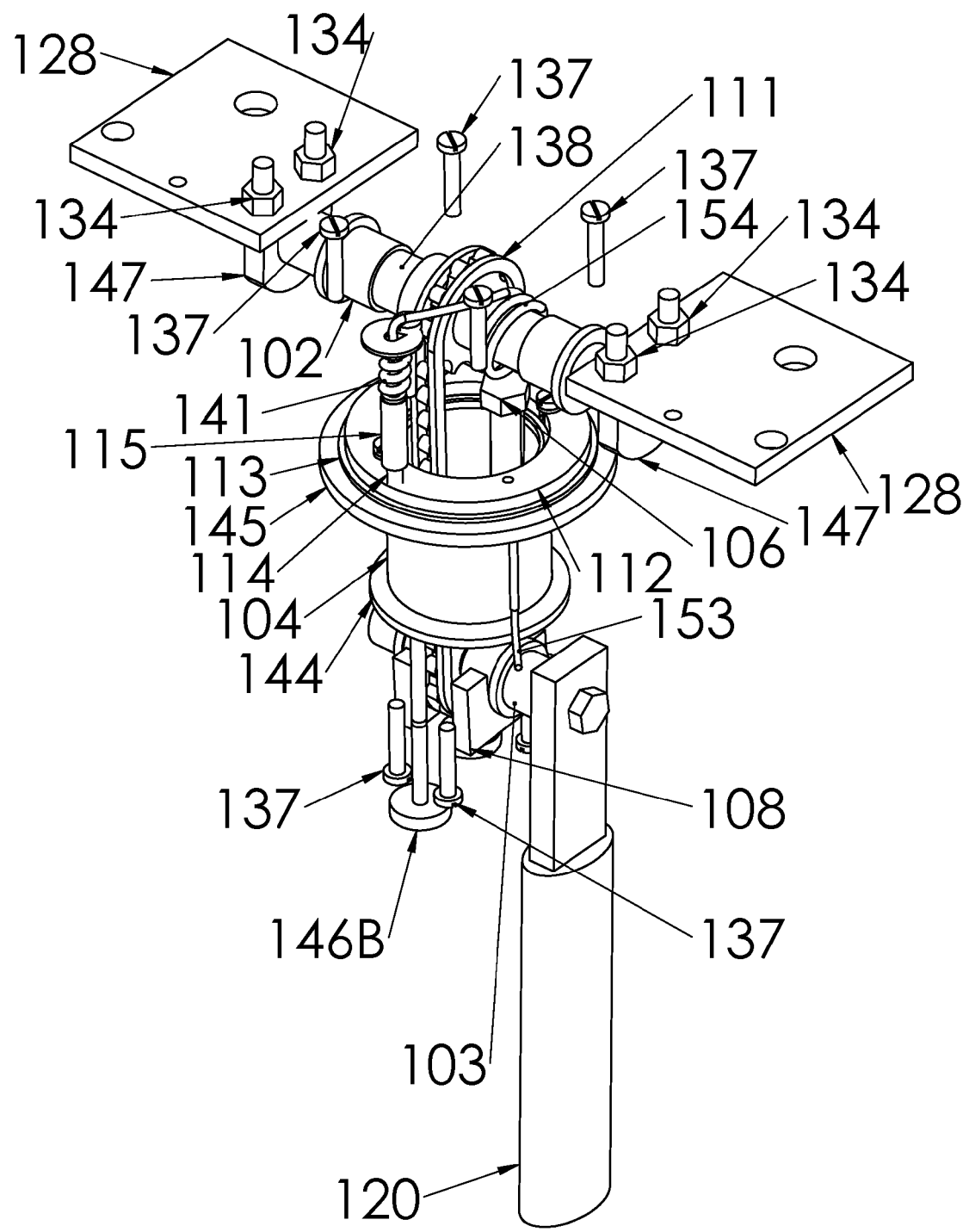
FIG. 3A is an isometric view of the hand operated mount's internal components in the assembled position.

FIG. 2B shows the power inlet wire 153, and power exit wires 152A, 152B. FIG. 3A illustrates that power comes in thru the inlet wire 153, which is soldered, to the electrical disc 113, which is insulated, from contacting any of the metal components and shorting out the electrical circuit by use of the electrical disc insulator 113 and shoulder spacer flanges 140. The electrical rod 114 is spring 141 loaded against the electrical disc 112 and is insulated from touching the exterior housing 117 by the electrical rod insulator 115 and shoulder spacer flange 140 and is held in place by the washer to retain electric spring 149 and has wire 154 soldered to it that loosely loops two and a half times around the exterior housing shaft 138 and then goes inside the exterior housing shaft 138 though a hole in the exterior housing shaft 138 and splits into two wires 152A and 152B and travels out the two ends of the exterior housing shaft 138 providing power to the device{s} that are mounted on the hand operated mount 100. Power exits the hand operated mount by way of wire 152A, and wire 152B. Electrical rod 114 rotates with the exterior housing 117 and interior housing 126 with its tip in contact against the electrical disc 112. The electrical disc 112 is fixed to the mounting housing 131 and does not move. Contact is maintained by use of the electric rod spring 141, which keeps pressure applied to the tip of the electrical rod 114 against the electrical disc 112 so as to maintain electrical current flowing as the interior housing 126 and exterior housing 117 are rotated and the mounting housing 131 remains in a fixed position. This allows 360 degree uninterrupted rotation of the exterior housing 117 and interior housing 126 without relying on a wire that would twist and crimp and break, or having to limit the rotation to prevent those problems. The electrical rod wire 154 loosely loops two and a half times around the exterior housing shaft 138 to allow for the 180-degree vertical rotational movement of the shaft. Wire 154 tightens when the shaft is rotated in one direction and loosens when it is rotated in the other direction. The groundside of the electrical circuit is made thru the housings and bearings, which are brass, aluminum, and stainless steel, or any other appropriate material. If the hand operated mount is installed in a non-electrical conductive material a ground wire will have to be placed under the mounting housing to provide grounding.

In FIG. 3B the thumbscrew 146A operated vertical brake shoe 109 is contacting the smooth part of the interior shaft sprocket 143. When thumbscrew 146A is tightened it causes the brake shoe 109 to bind against the sprocket 143 preventing the rotational movement of the shaft 139. The vertical brake allows the operator to lock the device{s} mounted on the hand operated mount 100 into an upright position, even if the vehicle or vessel it is mounted on is operated at a high rate of speed causing high wind pressure against the device{s}. Brake shoe 108 is contacting sleeve-bearing 101 and is used to adjust the resistance to movement on the vertical axis. Screw 137 is turned in to increase resistance and out to reduce resistance. Resistance must be adjusted because with no resistance the vertical axis is to easy to move and the device{s} mounted on the hand operated mount 100 will fall over due to gravity when the operator turns the handle 120 or handles 121 loose unless some resistance is maintained. The horizontal brake is controlled by thumbscrew 146B which when tightened pushes brake rod 107 up against thrust bearing 144 which is located between the interior housing 126 and the mounting housing 131. As thumbscrew 146B is tightened it causes resistance on the horizontal rotational axis up to the point of locking the horizontal axis as desired by the operator.

Figure 3B:
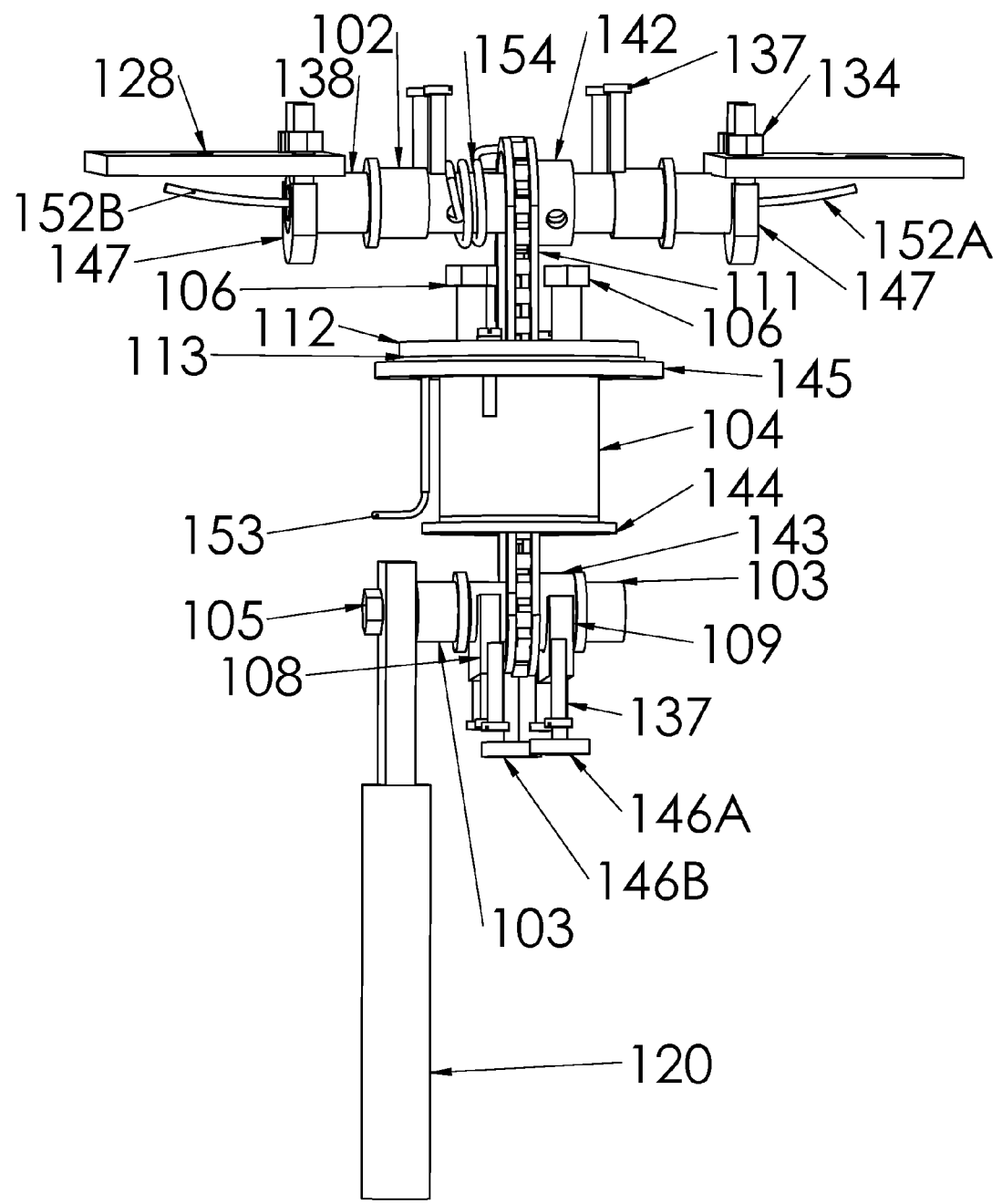
FIG. 3B is a back view of the hand operated mount's internal components in the assembled position.
Figure 3C:
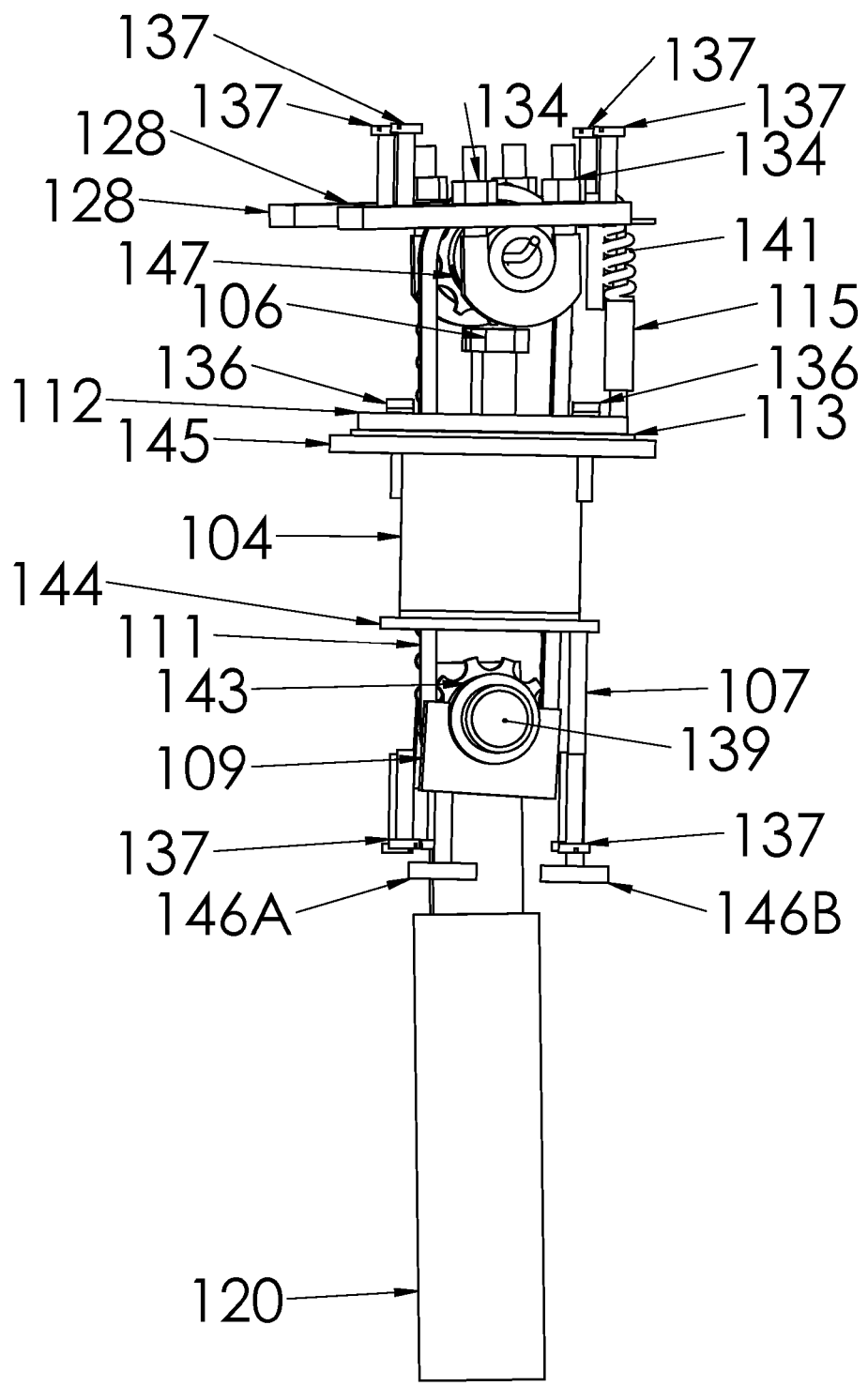
FIG. 3C is a left side view of the hand operated mount's internal components in the assembled position.
Figure 4:
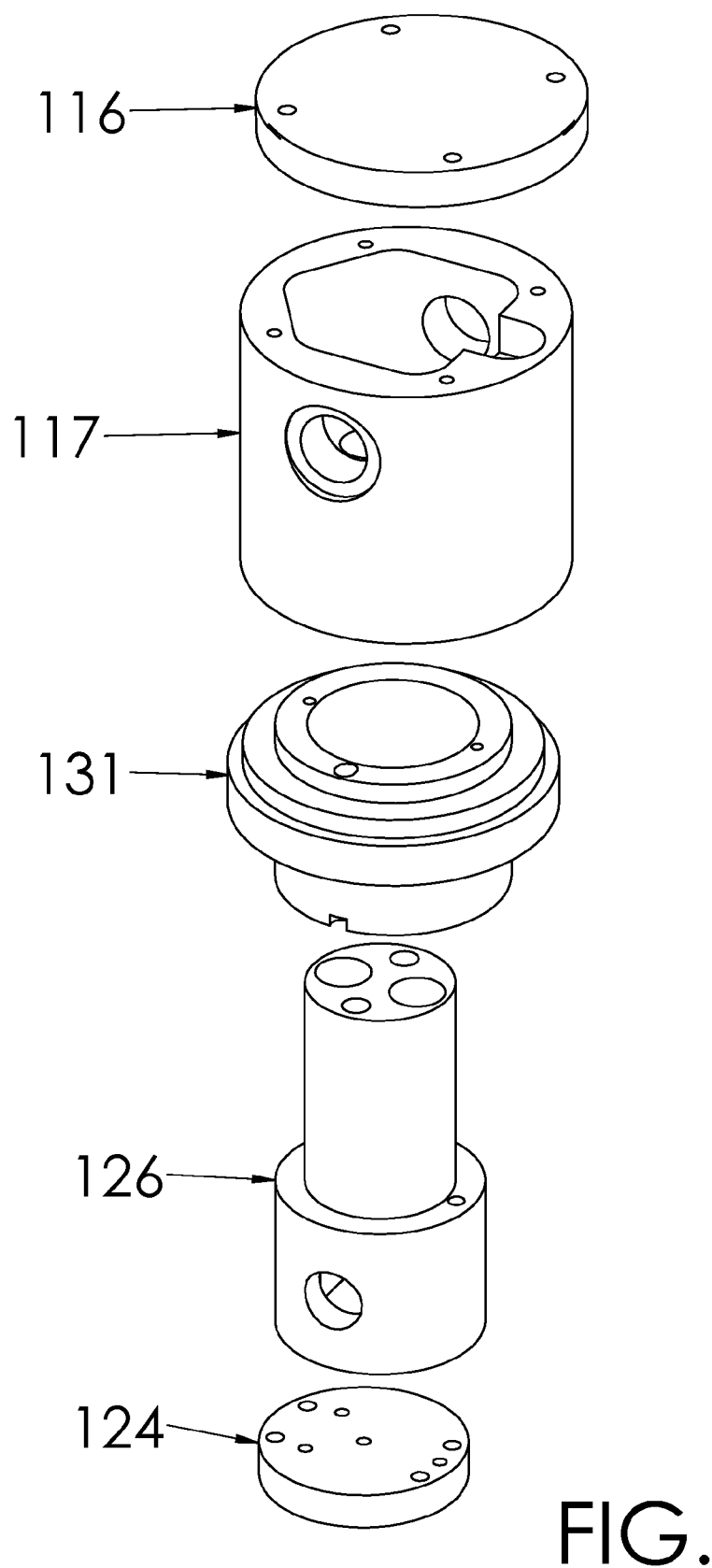
FIG. 4 is an isometric view of the housings and caps that make up the external body of the hand operated mount laid out in an expanded manner in the order that they are normally assembled.
Figure 5A:
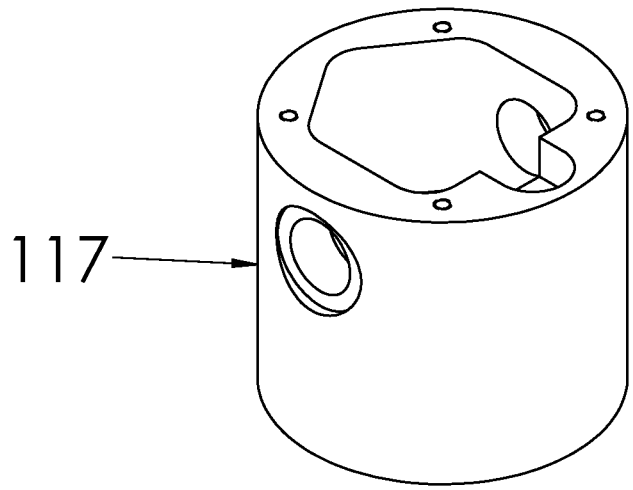
FIG. 5A is an isometric view of the exterior housing.
Figure 5B:
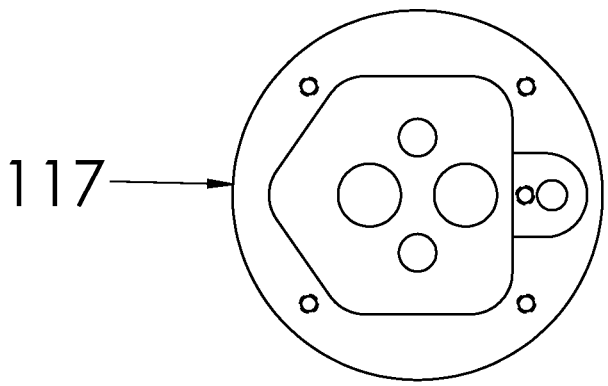
FIG. 5B is a top view of the exterior housing.
Figure 5C:
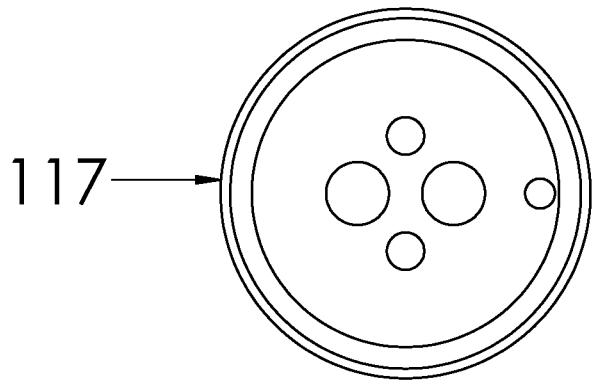
FIG. 5C is a bottom view of the exterior housing.
Figure 6A:
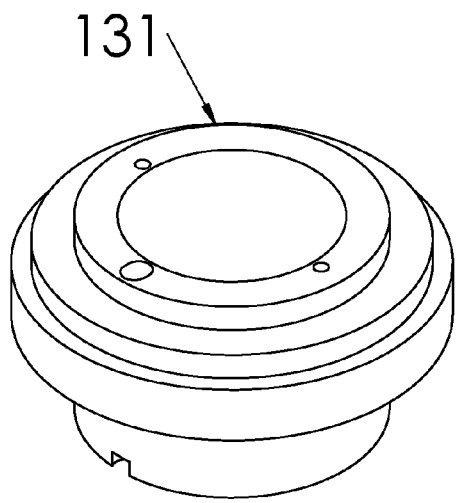
FIG. 6A is an isometric view of the mounting housing.
Figure 6B:
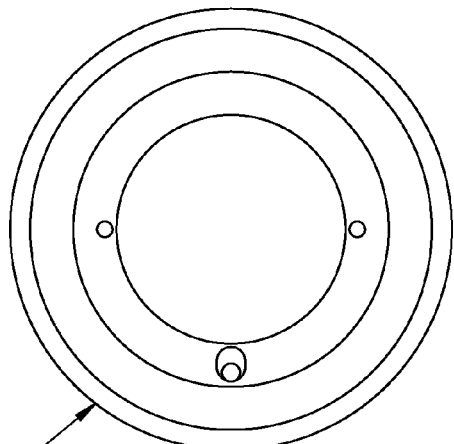
FIG. 6B is a top view of the mounting housing.
Figure 6C:
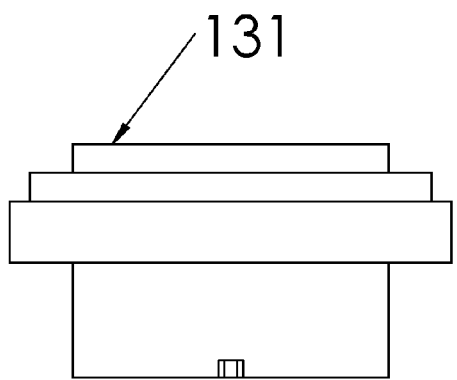
FIG. 6C is a side view of the mounting housing.
Figure 6D:
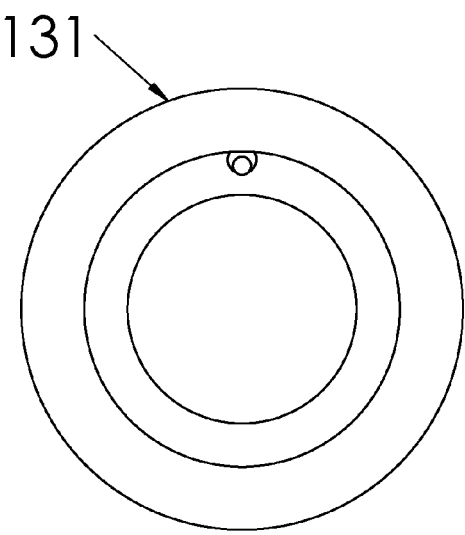
FIG. 6D is a bottom view of the mounting housing.
Figure 7A:
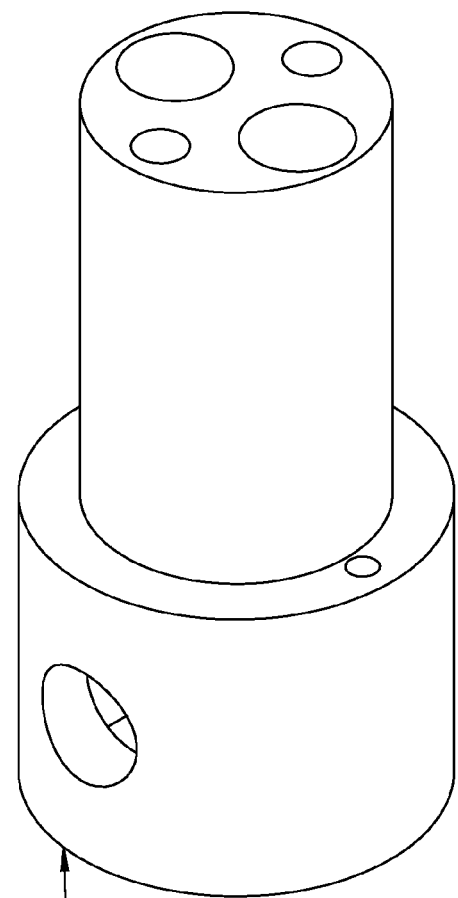
FIG. 7A is an isometric view of the interior housing.
Figure 7B:
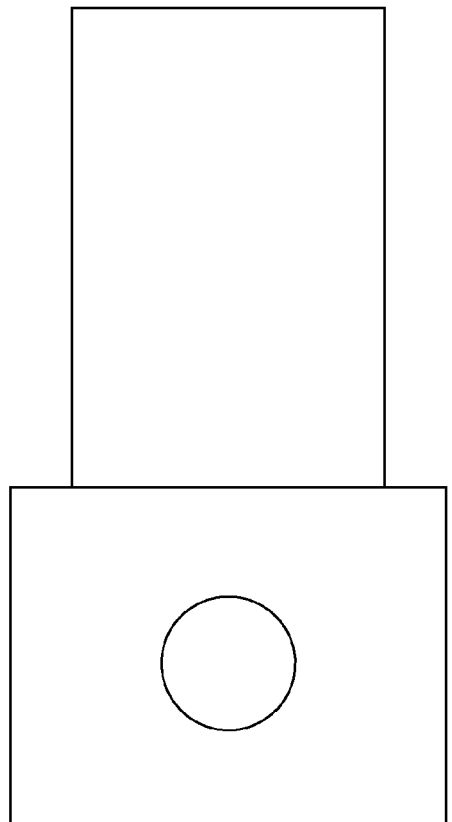
FIG. 7B is a side view of the interior housing.
Figure 7C:
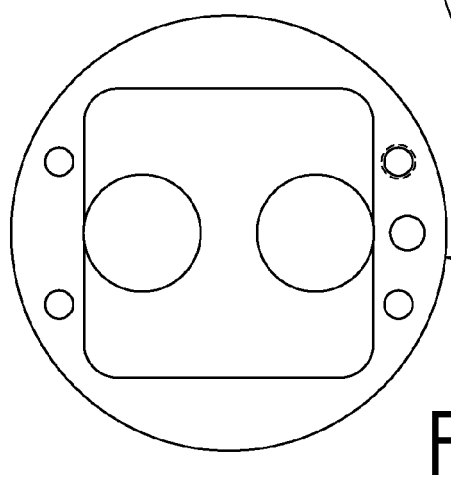
FIG. 7C is a bottom view of the interior housing.
Figure 8:
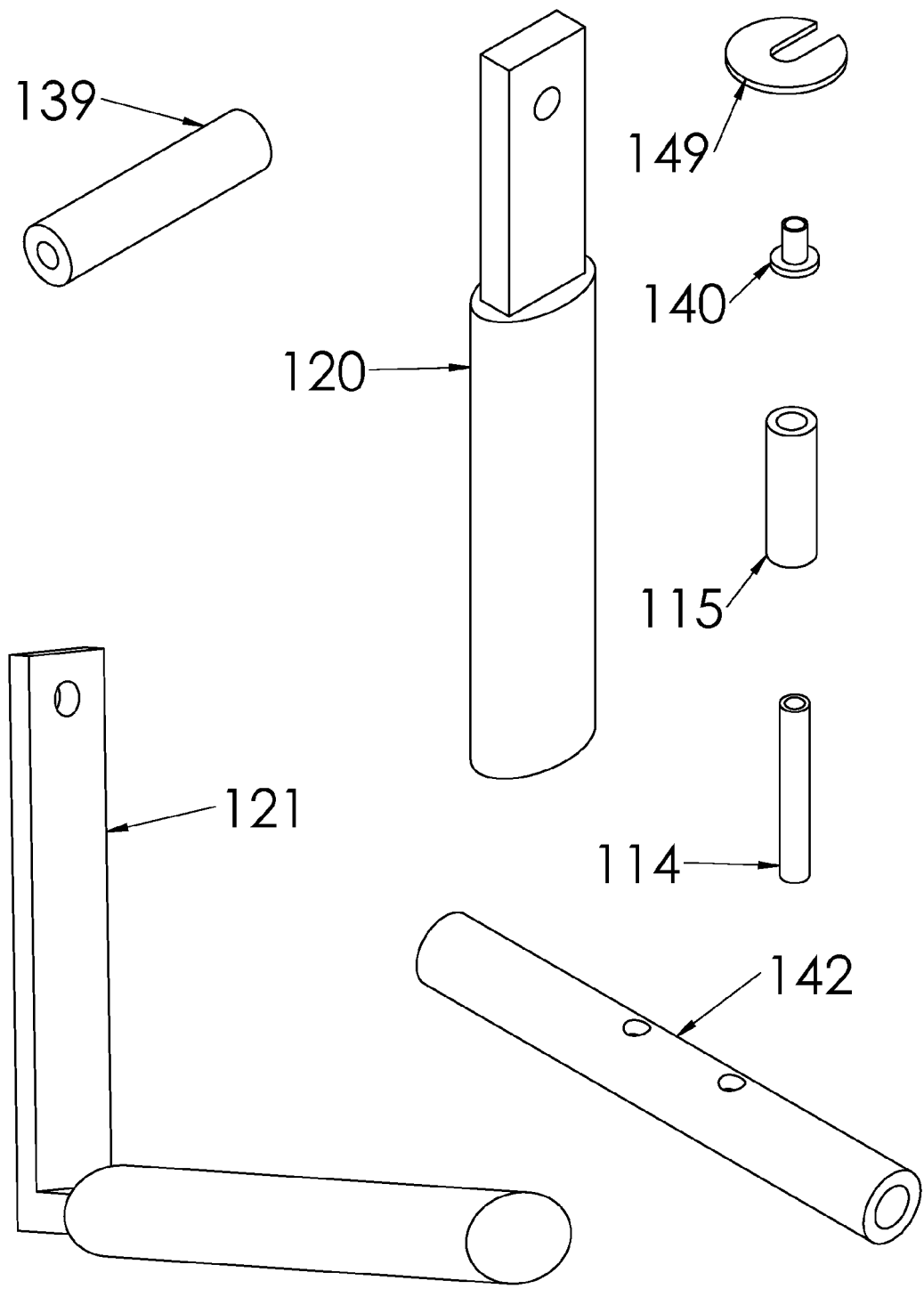
FIG. 8 is a perspective view of various internal components of the hand-operated mount. It includes; interior housing shaft 139, handle 120, washer to retain electric spring 149, shoulder spacer flange 140, electric rod insulator 115, electric rod 114, handle for use with a gun 121, exterior housing shaft 138.
Figure 9:
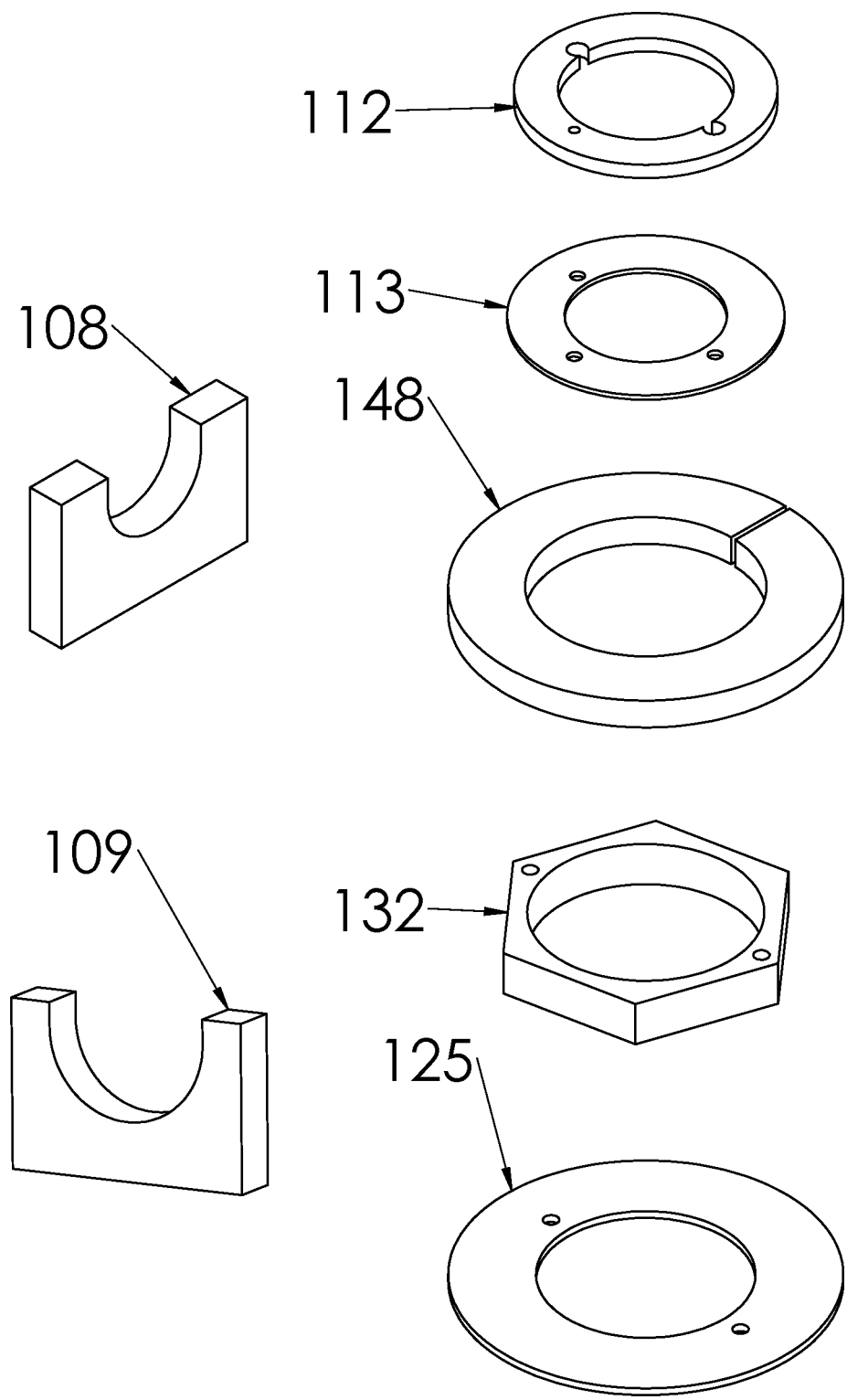
FIG. 9 is a perspective view of various internal components of the hand-operated mount. It includes; electrical disc 112, electrical disc insulator 113, washer to go between roof liners 148, mounting nut 132, interior-dressing washer 125, brake shoe used on the vertical resistance adjustment 108, brake shoe for vertical brake 109.
Figure 11A:
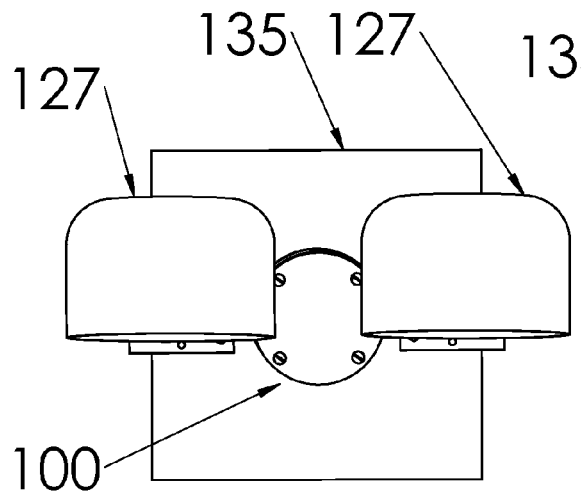
FIG. 11A, 11B, 11C, 11D are all top views of the hand operated mount with two spotlights mounted on it that demonstrates the horizontal rotation of the hand operated mount.
Figure 11B:
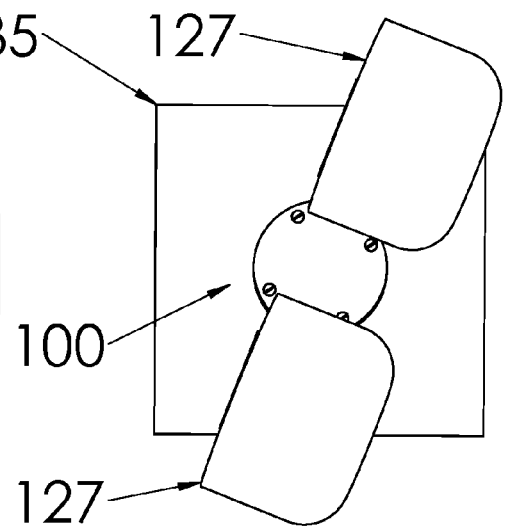
Figure 11C:
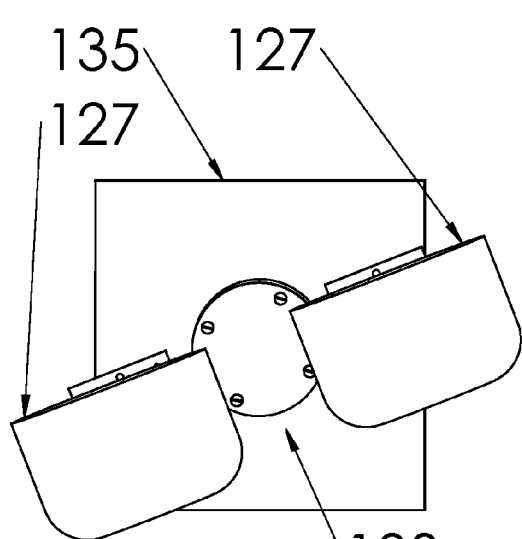
Figure 11D:
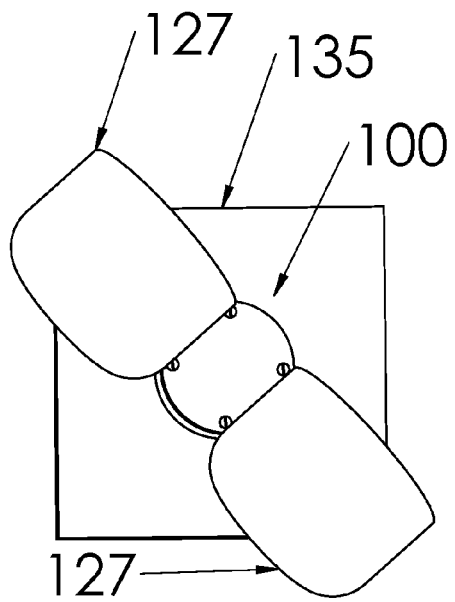
Figure 12A:
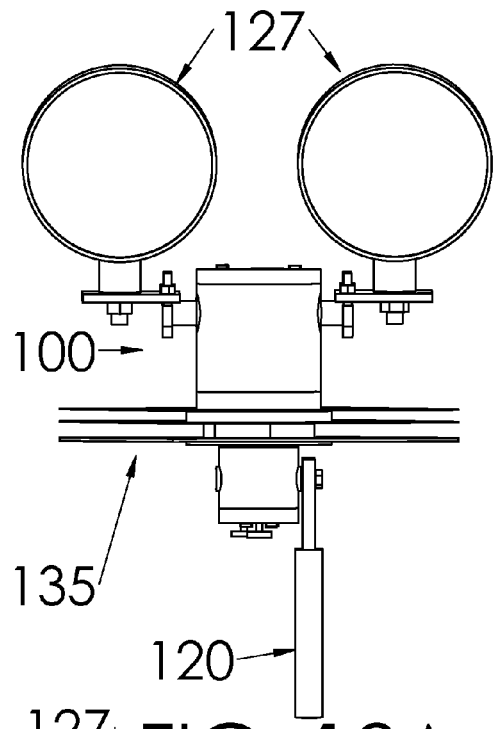
FIG. 12A, 12B, 12C, 12D are all side views of the hand-operated mount with two spotlights mounted on it that demonstrates the horizontal rotation of the hand-operated mount.
Figure 12B:
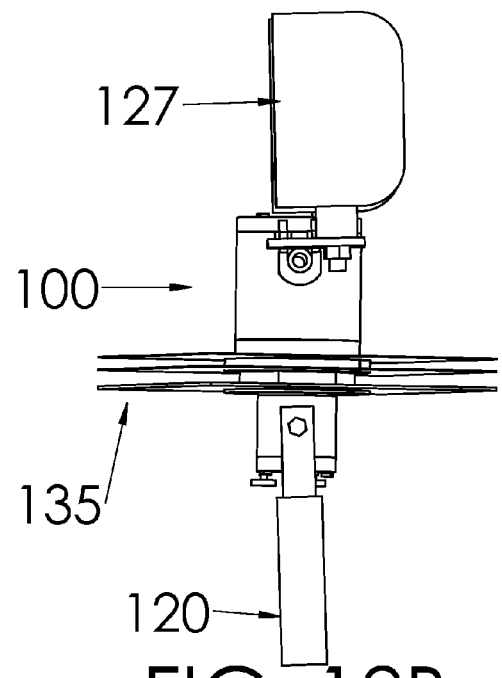
Figure 12C:
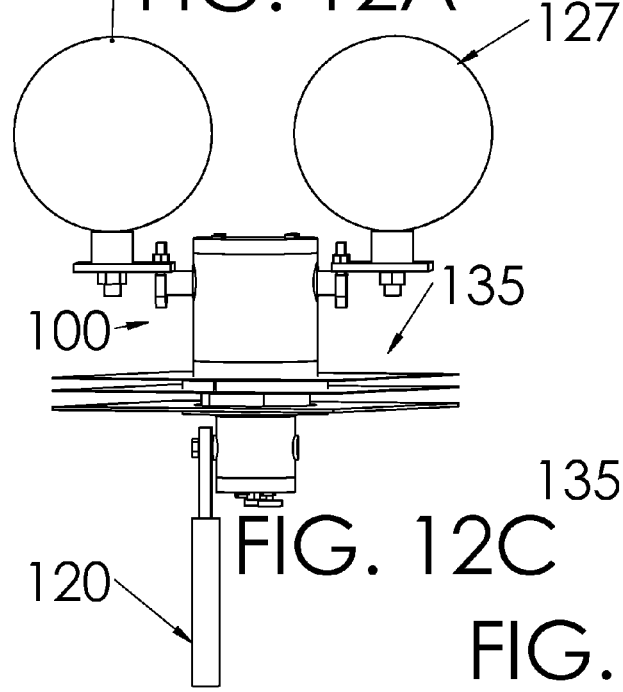
Figure 12D:
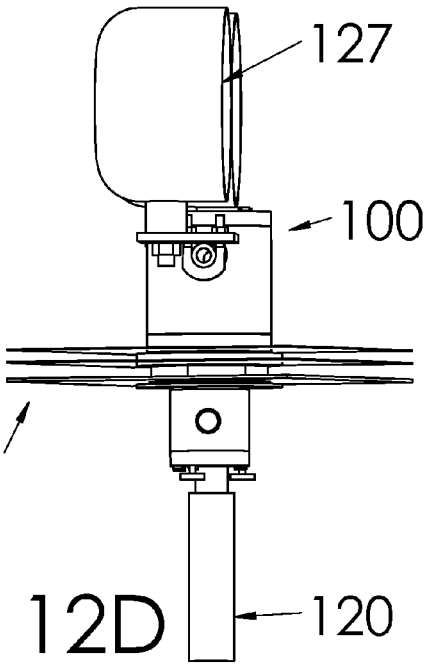
Figure 13:
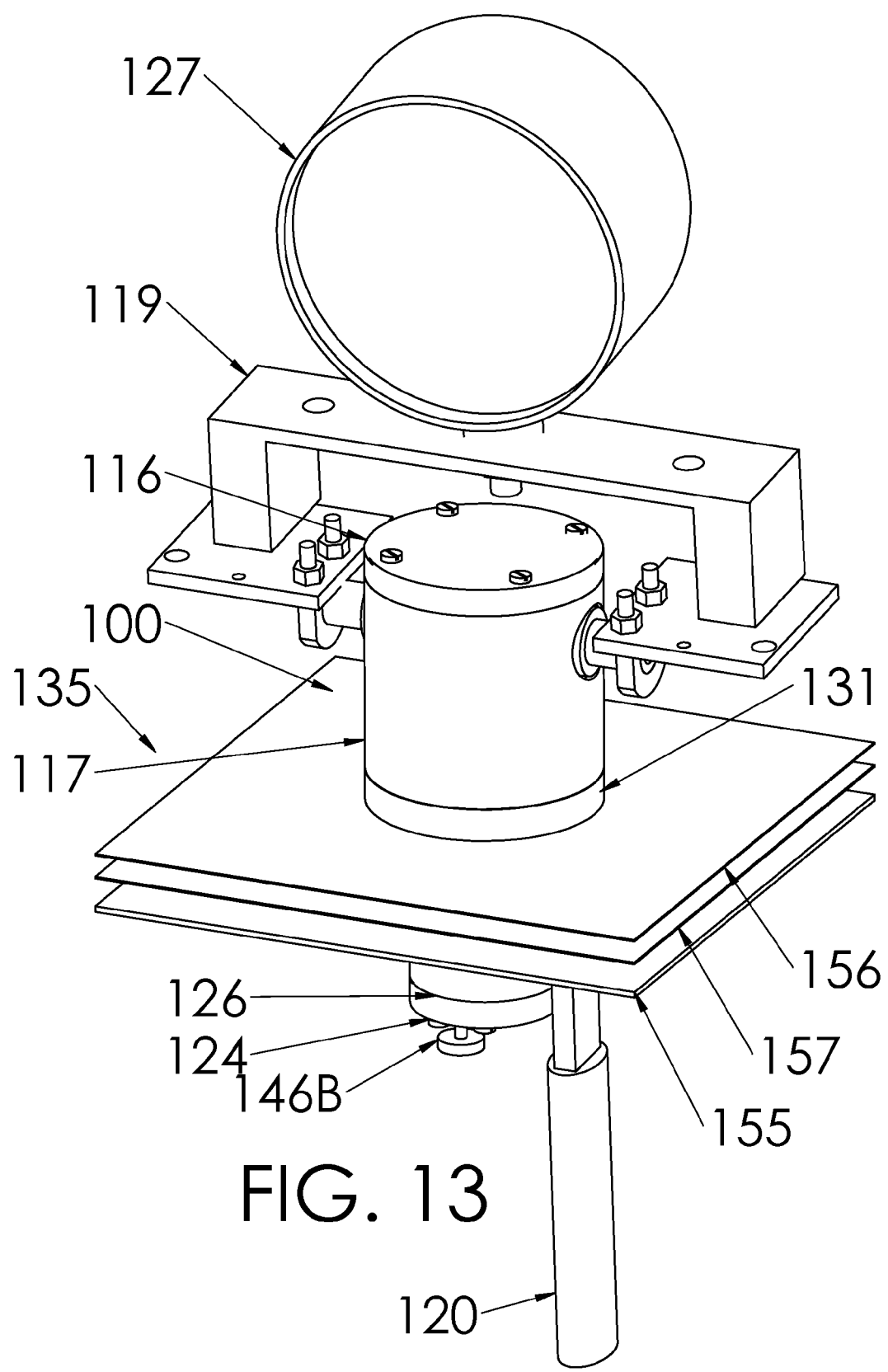
FIG. 13 is a perspective view of a hand-operated mount, mounted in a section of roof with a single spotlight mounted on the hand-operated mount.
Figure 14:
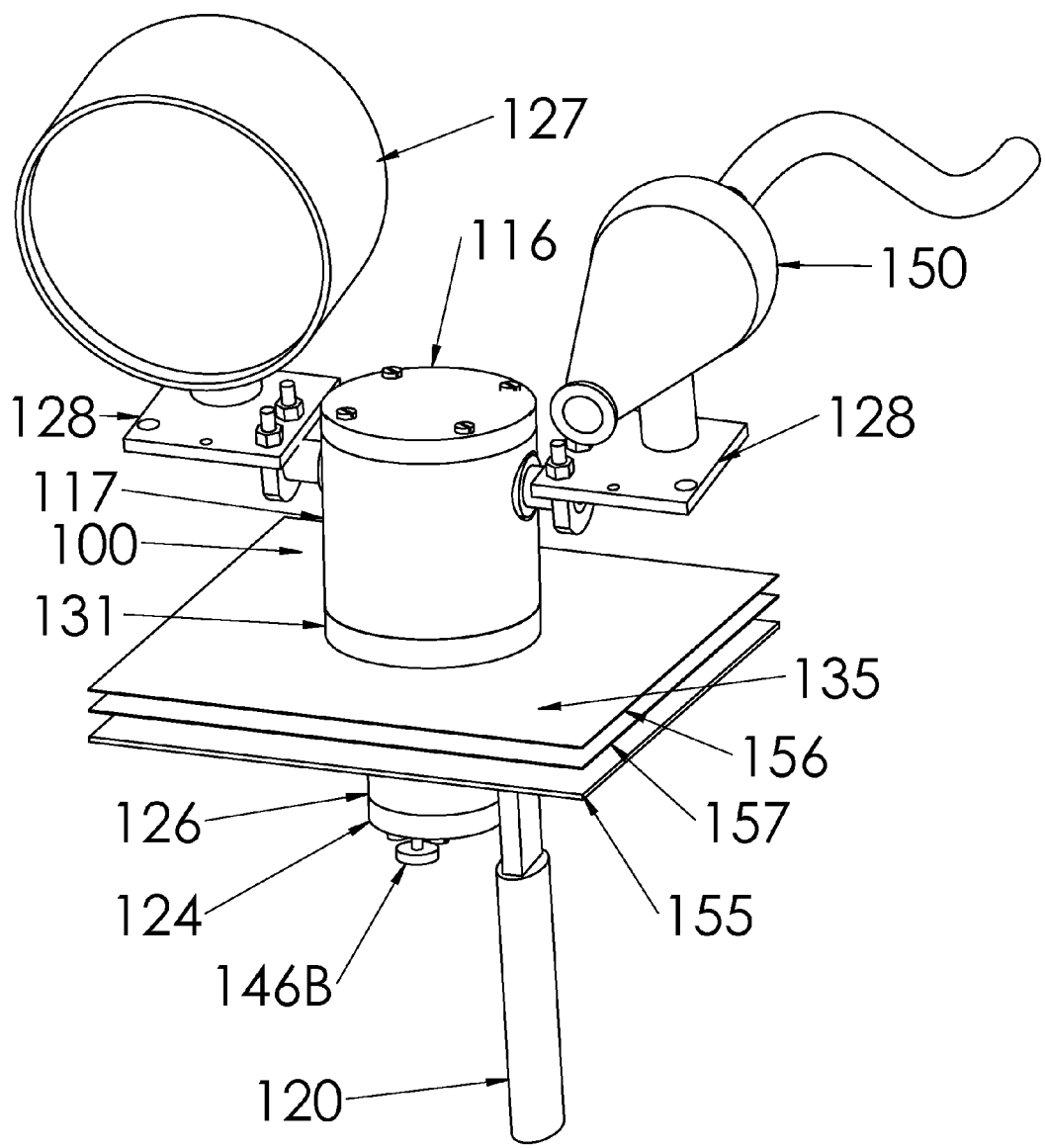
FIG. 14 is a perspective view of a hand-operated mount, mounted in a section of roof with a spotlight and a water canon mounted on the hand operated mount.
Figure 15:
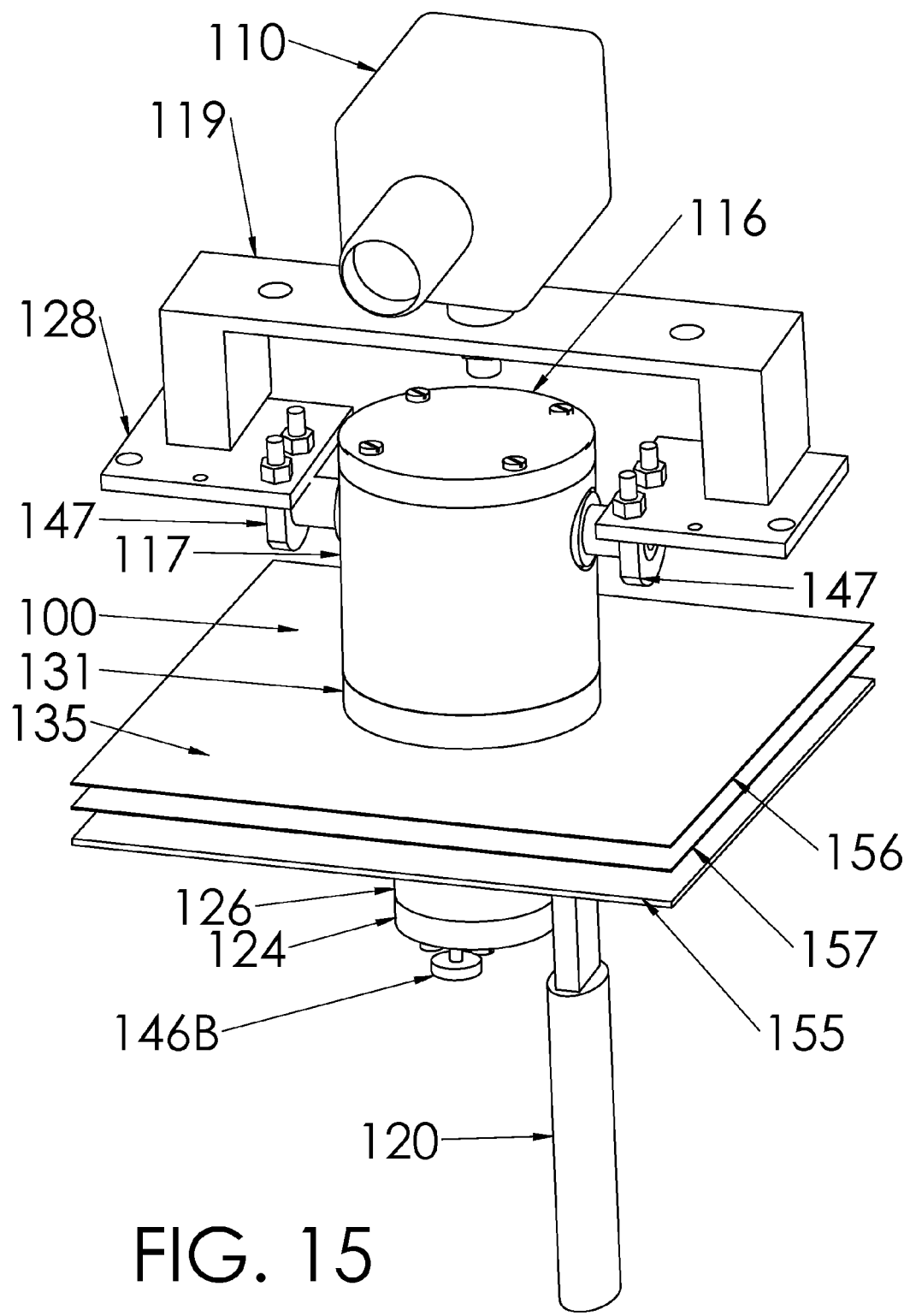
FIG. 15 is a perspective view of a hand-operated mount, mounted in a section of roof with a camera mounted on the hand-operated mount.
Figure 16:
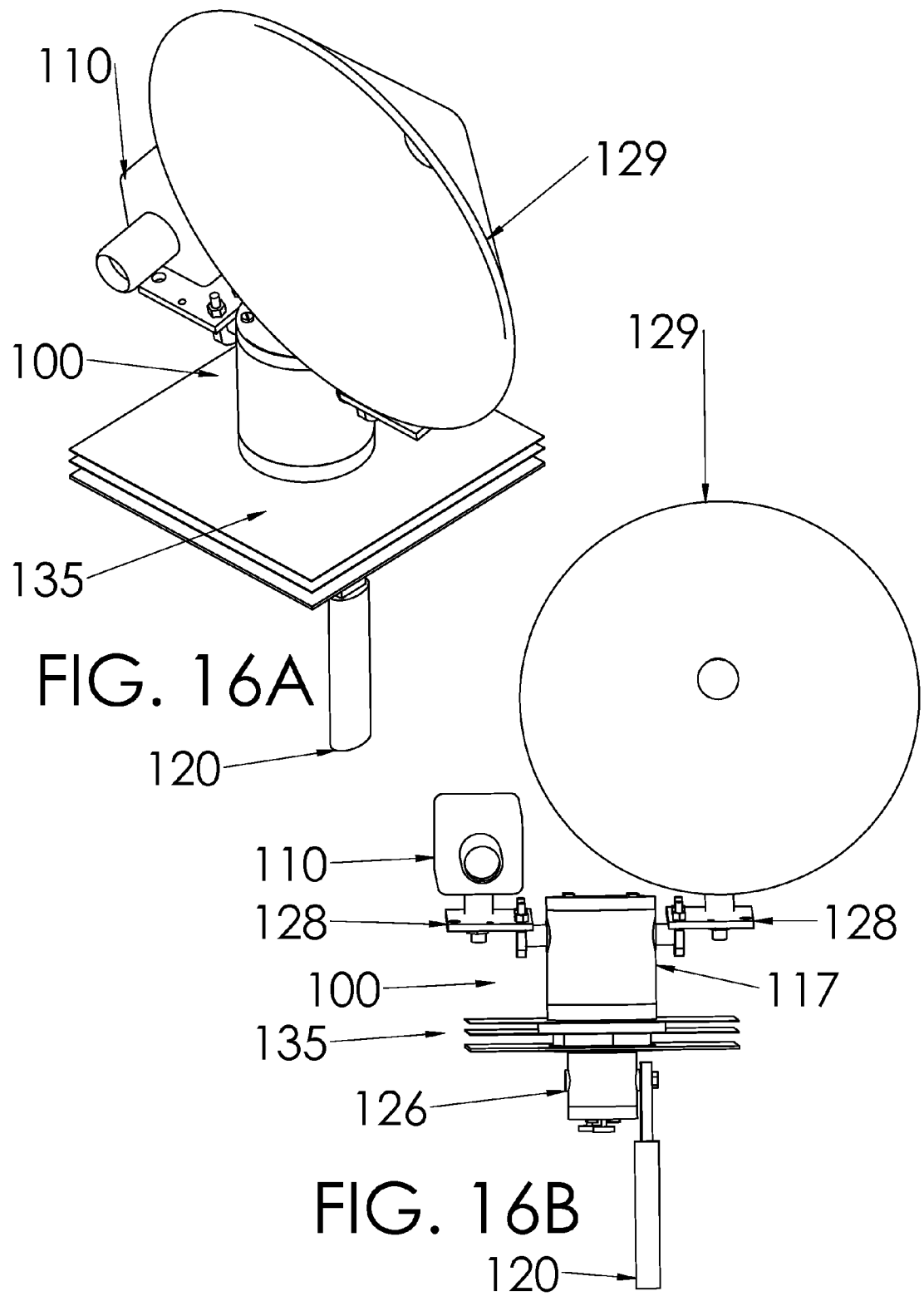
FIG. 16A is a perspective view and
FIG. 16B is a front view of a hand-operated mount, mounted in a section of roof with a camera and a listening device mounted on the hand operated mount.
Figure 17:
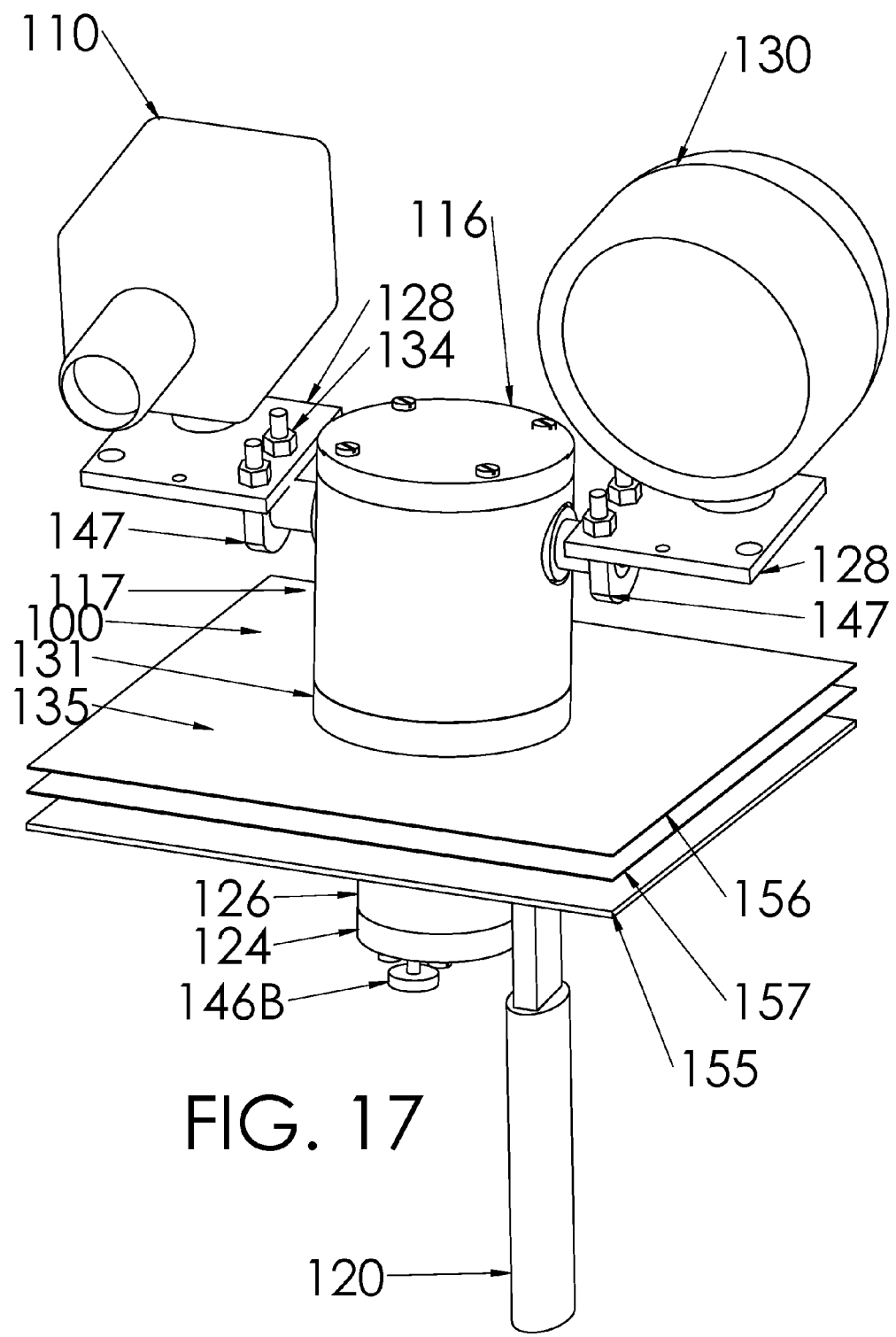
FIG. 17 is a perspective view of a hand-operated mount, mounted in a section of roof with a camera and a loudspeaker mounted on the hand operated mount.
Figure 18:
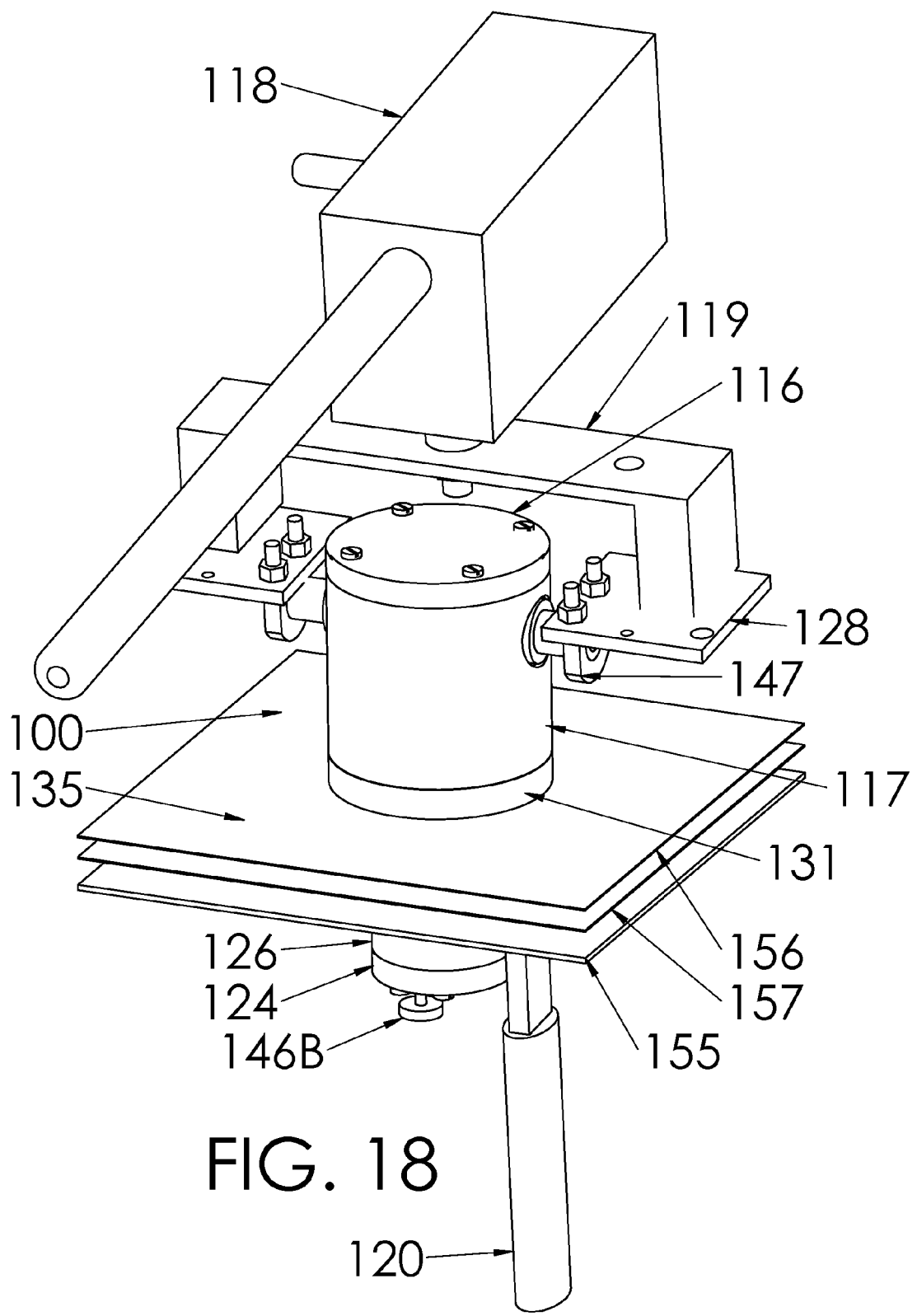
FIG. 18 is a perspective view of a hand-operated mount, mounted in a section of roof with a gun mounted on the hand-operated mount.
Figure 19:
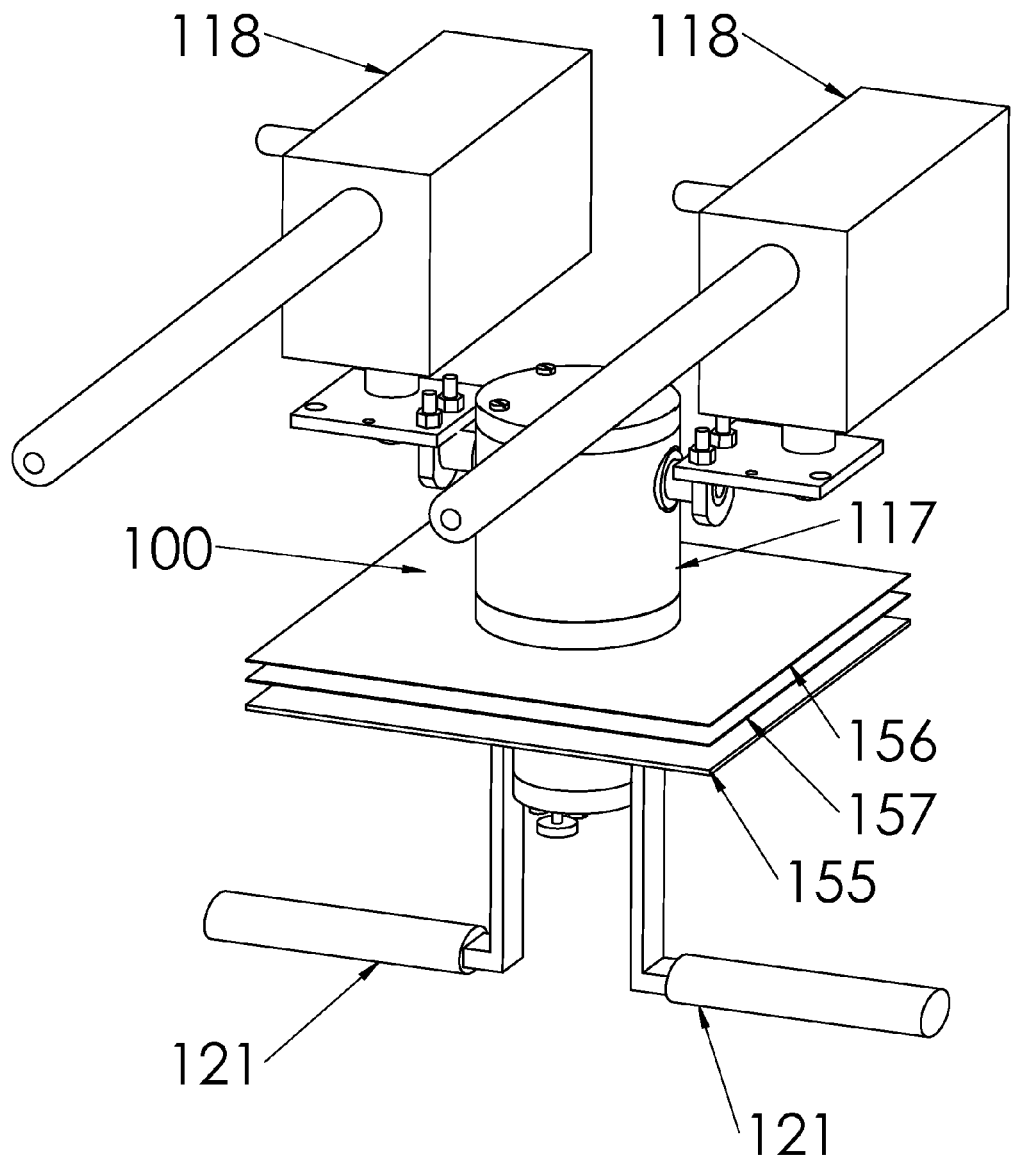
FIG. 19 is a perspective view of a hand-operated mount, mounted in a section of roof with two guns mounted on the hand-operated mount.

In FIG. 2A mounting bracket 128 is attached to the exterior housing shaft 138 with a u-bolt 147 and u-bolt nut 134. By using mounting bracket 128 on each side of the hand-operated mount two devices such as a listening device 129 and camera 110 FIG. 16A and 16B or a water canon 150 and a spotlight 127 FIG. 14, or a camera 110 and loud speaker 130 FIG. 17 can be mounted on the hand-operated mount. If a single device such as a spotlight 127, gun 118, or camera 110 is mounted in the center of the hand operated mount then the mounting bracket adapter 119 FIG. 13 is also used. The mounting bracket adapter 119 can also be used to mount more than one device such as two guns 118, or a heat-measuring device 123, and a camera 110 onto the hand-operated mount 100 as demonstrated in FIG. 20A and 20B. When mounting devices such as guns 118 which have backlash it may be desirable to use two gun handles 121 FIG. 19.

The invention claimed is:

1. A hand operated mount that allows a person with one or two hands from inside a vehicle, vessel or building that said hand operated mount is installed in to substantially quickly and accurately aim devices mounted on said hand operated mount at any target, said hand operated mount being configured to substantially rotate a horizontal axis that is generally fixed on a horizontal plain with approximately 360 degrees and substantially rotate a vertical axis approximately 180 degrees; and, wherein said hand operated mount substantially supplies power to lights or other devices mounted on it being configured to substantially avoid a possibility of a power wire causing trouble during a generally horizontal rotation or being limited in direction of rotation or number of rotations since power is transmitted that an electric rod that substantially brushes against an electrical disc providing power throughout said entire 360 degree horizontal rotation, being configured to substantially avoid twisting a wire, or having to turn said hand operated mount in reverse to unwind said power wire, wherein multiple electrical disc and rods can he installed if multiple power wires are needed.

2. The hand operated mount as claimed in claim 1, wherein said hand operated mount has an adjustable brake being configured to allow an operator to substantially decrease or increase a resistance to move said horizontal axis as desired by said operator or to substantially lock said horizontal axis in place by further tightening a horizontal brake thumbscrew located on an interior housing cap.

3. The hand operated mount as claimed in claim 1, wherein said, hand operated mount has an adjustment screw being configured to allow an operator substantially decrease or increase a resistance to substantially move said vertical axis as desired by said operator or to substantially lock said vertical axis in place by tightening a verfical axis brake thumbscrew both of which are located on an intetior housing cap.

4. The hand operated mount as claimed in claim 1, wherein said hand operated mount with one or two handles being configured to supply power to and substantially aim in any direction one, two or more devices comprising spotlights, or for US military use guns, or a combination of two devices comprised of night vision equipment and a gun; or for law enforcement use comprised of as directional listening device and a directional heat-measuring, device, or three devices comprised of a camera, listening device and gun, being ideal for military vehicles, police vehicles, security vehicles, delivery trucks, tug boats, ships, wreckers, utility trucks or similar vehicles.

5. The hand operated mount as claimed in claim 1, wherein said band operated mount is substantially durable and dependable with a chain drive for said vertical axis and solid body movement within bearings for said horizontal axis and is being configured to perform under stressful, dusty, or wet, or dry, or hot or cold conditions without degradation of performance.

6. The hand operated mount as claimed in claim 1, wherein said Hand Operated Mount being configured to have larger size chain sprockets in an exterior housing reducing travel of said vertical axis thereby substantially increasing an accuracy of an aim of US Military guns or similar devices that are mounted on it and controlled from inside a vehicle, vessel or building that it is mounted in.

7. The hand operated mount as claimed in claim 1, wherein said hand operated mount can be being configured to increase in size in order to substantially carry and control larger guns or devices that are mounted on said hand operated mount outside of a vehicle, vessel or building allowing an operator to control said larger guns or devices from within said vehicle, vessel or building.

* * * * *